US012495029B2

(12) United States Patent
Comak et al.

(10) Patent No.: US 12,495,029 B2
(45) Date of Patent: Dec. 9, 2025

(54) DATA COLLECTION COORDINATION FUNCTION (DCCF) DATA ACCESS AUTHORIZATION WITHOUT MESSAGING FRAMEWORK

(71) Applicant: Telefonaktiebolaget LM Ericsson (publ), Stockholm (SE)

(72) Inventors: Pinar Comak, Ankara (TR); Ferhat Karakoc, Istanbul (TR); Christine Jost, Dalby (SE); Zhang Fu, Stockholm (SE); Ulf Mattsson, Kungsbacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 18/555,959

(22) PCT Filed: May 2, 2022

(86) PCT No.: PCT/EP2022/061707
§ 371 (c)(1),
(2) Date: Oct. 18, 2023

(87) PCT Pub. No.: WO2022/238161
PCT Pub. Date: Nov. 17, 2022

(65) Prior Publication Data
US 2024/0380744 A1   Nov. 14, 2024

Related U.S. Application Data

(60) Provisional application No. 63/186,283, filed on May 10, 2021.

(51) Int. Cl.
*H04L 9/40* (2022.01)
*H04L 41/12* (2022.01)
*H04L 41/40* (2022.01)

(52) U.S. Cl.
CPC .......... *H04L 63/0807* (2013.01); *H04L 41/12* (2013.01); *H04L 41/40* (2022.05)

(58) Field of Classification Search
CPC ... H04L 63/0807; H04L 41/12; H04L 41/122; H04L 41/34; H04L 41/342; H04L 41/344; H04L 41/40
See application file for complete search history.

(56) References Cited

U.S. PATENT DOCUMENTS

| 2022/0052989 A1* | 2/2022 | Zhao | H04L 63/0807 |
| 2022/0095111 A1* | 3/2022 | Fu | H04W 36/0011 |
| 2022/0116400 A1* | 4/2022 | Khare | H04L 63/083 |

FOREIGN PATENT DOCUMENTS

| KR | 1020150090151 | 8/2015 |
| WO | 2020141356 A1 | 7/2020 |

(Continued)

OTHER PUBLICATIONS

"3GPP TR 33.866 V0.4.0", 3rd Generation Partnership Project; Technical Specification Group Services and System Aspects; Study on security aspects of enablers for Network Automation (eNA) for the 5G system (5GS) Phase 2; (Release 17), Mar. 2021, pp. 1-30.

(Continued)

*Primary Examiner* — Hee Soo Kim
(74) *Attorney, Agent, or Firm* — Murphy, Bilak & Homiller, PLLC

(57) ABSTRACT

Embodiments include methods for a data consumer network function (NF) of a communication network. These methods include sending, to a network repository function (NRF) of the communication network, a request for an access token for the following: a service provided by a 5 data collection coordination function (DCCF) of the communication network, and data to be collected via the DCCF service. These methods include receiving from the NRF at least one access token for the DCCF service and for the data to be collected (Continued)

via the DCCF service and, using the at least one access token, collecting the data from a data producer NF of the communication network via the DCCF service. Other embodiments include complementary methods for DCCFs 0 and NRFs, as well as data consumer NFs, DCCFs, and NRFs configured to perform such methods.

23 Claims, 12 Drawing Sheets

(56) References Cited

FOREIGN PATENT DOCUMENTS

| | | |
|---|---|---|
| WO | 2020221219 A1 | 11/2020 |
| WO | WO-2020220919 A1 * | 11/2020 |

OTHER PUBLICATIONS

"3rd Generation Partnership Project; Technical Specification Group Services and System Aspects; Security architecture and procedures for 5G system (Release 17)", 3GPP TS 33.501 V17.1.0, Mar. 2021, pp. 1-256.

"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.

"3GPP TS 23.502 V16.7.0", 3rd Generation Partnership Project; Technical Specification Group Services and System Aspects; Procedures for the 5G System (5GS); Stage 2 (Release 16), Dec. 2020, pp. 1-603.

"3GPP TS 33.501 V16.4.0", 3rd Generation Partnership Project; Technical Specification Group Services and System Aspects; Security architecture and procedures for 5G system (Release 16), Sep. 2020, pp. 1-250.

"3GPP TR 23.700-91 V17.0.0", 3rd Generation Partnership Project; Technical Specification Group Services and System Aspects; Study on enablers for network automation for the 5G System (5GS); Phase 2 (Release 17), Dec. 2020, pp. 1-382.

"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.

Jones, M., et al., "JSON Web Signature (JWS)", Internet Engineering Task Force (IETF), Request for Comments: 7515, Category: Standards Track, May 2015, pp. 1-59.

Jones, M., et al., "JSON Web Token (JWT)", Internet Engineering Task Force (IETF), Request for Comments: 7519, Category: Standards Track, ISSN: 2070-1721, May 2015, pp. 1-30.

* cited by examiner

DATA COLLECTION COORDINATION FUNCTION (DCCF) DATA ACCESS AUTHORIZATION WITHOUT MESSAGING FRAMEWORK

TECHNICAL FIELD

The present disclosure relates generally to the field of communication networks, and more specifically to techniques for authorizing network functions (NFs) to collect and/or consume data produced by other NFs in a communication network.

INTRODUCTION

Currently the fifth generation ("5G") of cellular systems, also referred to as New Radio (NR), is being standardized within the Third-Generation Partnership Project (3GPP). NR is developed for maximum flexibility to support multiple and substantially different use cases.

These include enhanced mobile broadband (eMBB), machine type communications (MTC), ultra-reliable low latency communications (URLLC), side-link device-to-device (D2D), and several other use cases.

At a high level, the 5G System (5GS) consists of an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

FIG. 1 illustrates a high-level view of an exemplary 5G network architecture, consisting of a Next Generation Radio Access Network (NG-RAN) 199 and a 5G Core (5GC) 198. NG-RAN 199 can include one or more gNodeB's (gNBs) connected to the 5GC via one or more NG interfaces, such as gNBs 100, 150 connected via respective interfaces 102, 152. More specifically, gNBs can be connected to one or more Access and Mobility Management Functions (AMFs) in the 5GC via respective NG-C interfaces. Similarly, gNBs can be connected to one or more User Plane Functions (UPFs) in the 5GC via respective NG-U interfaces. Various other network functions (NFs) can be included in the 5GC, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one or more cells and, in some cases, can provide coverage in the respective cells via various directional beams.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region."

The NG RAN nodes shown in FIG. 1 include a Central Unit (CU or gNB-CU) and one or more Distributed Units (DU or gNB-DU). For example, gNB 100 includes gNB-CU 110 and gNB-DUs 120 and 130. CUs are logical nodes that host higher-layer protocols and perform various gNB functions such controlling the operation of DUs. DUs are logical nodes that host lower layer protocols and can include various subsets of the gNB functions. As such, CUs and DUs can include various circuitry needed to perform their respective functions, including processing circuitry, communication interface circuitry, power supply circuitry, etc.

A gNB-CU connects to one or more gNB-DUs over respective F1 logical interfaces, such as interfaces 122 and 132 shown in FIG. 1. However, a gNB-DU can be connected to only one gNB-CU, with the gNB-CU and connected gNB-DU(s) visible to other gNBs and the 5GC as a gNB. In other words, the F1 interface is not visible beyond gNB-CU.

Another change in 5G networks (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context. This 5G SBA model is based on principles including modularity, reusability and self-containment of NFs, which can enable network deployments to take advantage of the latest virtualization and software technologies.

Token-based authorization for the SBA is defined in 3GPP TS 33.501 V.17.1.0. This mechanism involves a consumer for a NF service (referred to as "NF Service Consumer" or more simply "Service Consumer") obtaining an access token for the desired service from an authorization server before access the service. Access tokens are JSON Web Tokens as described in RFC 7519 (published by IETF) and are secured with digital signatures or Message Authentication Codes (MAC) based on JSON Web Signature (JWS) as described in IETF RFC 7515.

Indirect communication in SBA was specified in 3GPP Rel-16, using a Service Communication Proxy (SCP) as a standardized proxy between Service Consumers and Service Producers. With respect to token-based authorization, Rel-16 added the capability for the SCP to request access tokens on behalf of Service Consumers. 3GPP Rel-17 enhances the SBA by adding a Data Management Framework that includes a Data Collection Coordination Function (DCCF) and an optional messaging framework. Data consumers ask DCCF for data collection in relation to a data source. The DCCF subscribes to the data source (if it does not have a subscription already) and then coordinates the request and data delivery, e.g., using the messaging framework. The data source inputs the requested data to the messaging framework, which delivers the data to the data consumer.

SUMMARY

Two access tokens are needed for each DCCF service request: one indicating that the consumer can access the DCCF service, and another indicating that the DCCF service can access the data on behalf of the consumer. However, there are various problems, issues, and/or difficulties that can occur when using access tokens for data collection via the Data Management Framework, particularly when the optional messaging framework is not used.

Accordingly, embodiments of the present disclosure address these and other problems, issues, and/or difficulties that can occur at failover, thereby enabling the otherwise-advantageous deployment of DCCF functionality in a 5G system.

Some embodiments of the present disclosure include methods (e.g., procedures) for a data consumer network function (NF) of a communication network. These exemplary methods can be performed by various NFs and/or network nodes of the communication network (e.g., 5GC).

These exemplary methods can include sending, to a network repository function (NRF) of the communication network, a request for an access token for the following: a service provided by a DCCF of the communication network, and data to be collected via the DCCF service. These exemplary methods can also include receiving, from the NRF, at least one access token for the DCCF service and for the data to be collected via the DCCF service. These exemplary methods can also include, using the at least one access token, collecting the data from a data producer NF of the communication network via the DCCF service.

In some embodiments, the collecting operations can include sending the received at least one access token to the DCCF and receiving the data from the data producer NF via the DCCF. In various embodiments, the request for the access token can include a name or identifier of the DCCF service and an identifier of the data to be collected. In some of these embodiments, the request for an access token can also include one or more of the following: an identifier of the data producer NF, and an identifier of a service that produces the data to be collected.

In some embodiments, a single access token can be received from the NRF and includes the following: an identifier of the DCCF; an identifier of the DCCF service, an identifier of the data producer NF, an identifier of a service of the data producer NF, and an identifier of the data to be collected.

In other embodiments, first and second access tokens are received from the NRF. In such embodiments, the first access token includes an identifier of the DCCF and an identifier of the DCCF service, while the second access token includes an identifier of the data producer NF, an identifier of a service of the data producer NF, and an identifier of the data to be collected.

In some embodiments, the at least one access token indicates that the data consumer NF is authorized to access the DCCF service and that the data consumer NF is authorized to access the data to be collected.

Other embodiments include exemplary methods (e.g., procedures) for a DCCF of a communication network (e.g., 5GC).

These exemplary methods can include receiving, from a data consumer NF of the communication network, at least one access token for the following: a service provided by the DCCF, and data to be collected via the DCCF service. These exemplary methods can also include, based on the at least one access token, determining whether the data consumer NF is authorized to access the DCCF service and the data to be collected. These exemplary methods can also include, based on determining that the data consumer NF is authorized to access the DCCF service and the data to be collected, performing the DCCF service to request a data producer NF to provide the data to the data consumer NF.

In some embodiments, a single access token can be received from the data consumer NF and includes the following: an identifier of the DCCF, an identifier of the DCCF service, an identifier of the data producer NF, an identifier of a service of the data producer NF, and an identifier of the data to be collected.

In other embodiments, first and second access tokens can be received from the data consumer NF. In such embodiments, the first access token includes an identifier of the DCCF and an identifier of the DCCF service, while the second access token includes an identifier of the data producer NF, an identifier of a service of the data producer NF, and an identifier of the data to be collected.

In some embodiments, the at least one access token indicates that the data consumer NF is authorized to access the DCCF service and that the data consumer NF is authorized to access the data to be collected. In some embodiments, performing the DCCF service can include sending the at least one access token to the data producer NF.

In some embodiments, these exemplary methods can also include storing the at least one access token in local storage and subsequently retrieving the at least one access token from local storage in response to a further request from the data consumer NF for the data to be collected.

Other embodiments include methods (e.g., procedures) for an NRF of a communication network.

These exemplary methods can include receiving, from a data consumer NF of the communication network, a request for an access token for the following: a service provided by a DCCF of the communication network, and data to be collected via the DCCF service. These exemplary methods can also include determining whether the data consumer NF is authorized to access the DCCF service and the data to be collected via the DCCF service. These exemplary methods can also include, based on determining that the data consumer NF is authorized to access the DCCF service and the data to be collected, sending to the data consumer NF at least one access token for the DCCF service and for the data to be collected via the DCCF service.

In some embodiments, the request for an access token can include a name or identifier of the DCCF service and an identifier of the data to be collected. In some of these embodiments, the request for an access token also includes one or more of the following: an identifier of a data producer NF that produces the data to be collected, and an identifier of a service that produces the data to be collected. In other of these embodiments, these exemplary methods can also include determining a data producer NF and a service of the data producer NF that produce the data to be collected, based on the identifier of the data to be collected.

In some embodiments, a single access token can be sent to the data consumer NF and includes the following: an identifier of the DCCF, an identifier of the DCCF service, an identifier of the data producer NF, an identifier of a service of the data producer NF, and an identifier of the data to be collected.

In other embodiments, first and second access tokens can be sent to the data consumer NF. In such embodiments, the first access token includes an identifier of the DCCF and an identifier of the DCCF service, while the second access token includes an identifier of the data producer NF, an identifier of a service of the data producer NF, and an identifier of the data to be collected.

In some embodiments, the at least one access token indicates that the data consumer NF is authorized to access the DCCF service and that the data consumer NF is authorized to access the data to be collected.

Other embodiments include data consumer NFs, DCCFs, and NRFs (or network nodes hosting the same) that are configured to perform the operations corresponding to any of the exemplary methods described herein. Other embodiments also include non-transitory, computer-readable media storing computer-executable instructions that, when executed by processing circuitry associated with such NFs, DCCFs, and NRFs, configure the same to perform operations corresponding to any of the exemplary methods described herein.

Embodiments of the present disclosure can improve data collection within a network via DCCF by providing efficient techniques for authorization of data consumers for both accessing the DCCF and collecting the needed data. Such techniques can reduce the number of access tokens generated and the amount of signaling and workload for the network. In this manner, embodiments can facilitate easier data collection and analysis within the network, which can improve network performance.

These and other objects, features, and advantages of the present disclosure will become apparent upon reading the following Detailed Description in view of the Drawings briefly described below.

DETAILED DESCRIPTION

Figure 1:
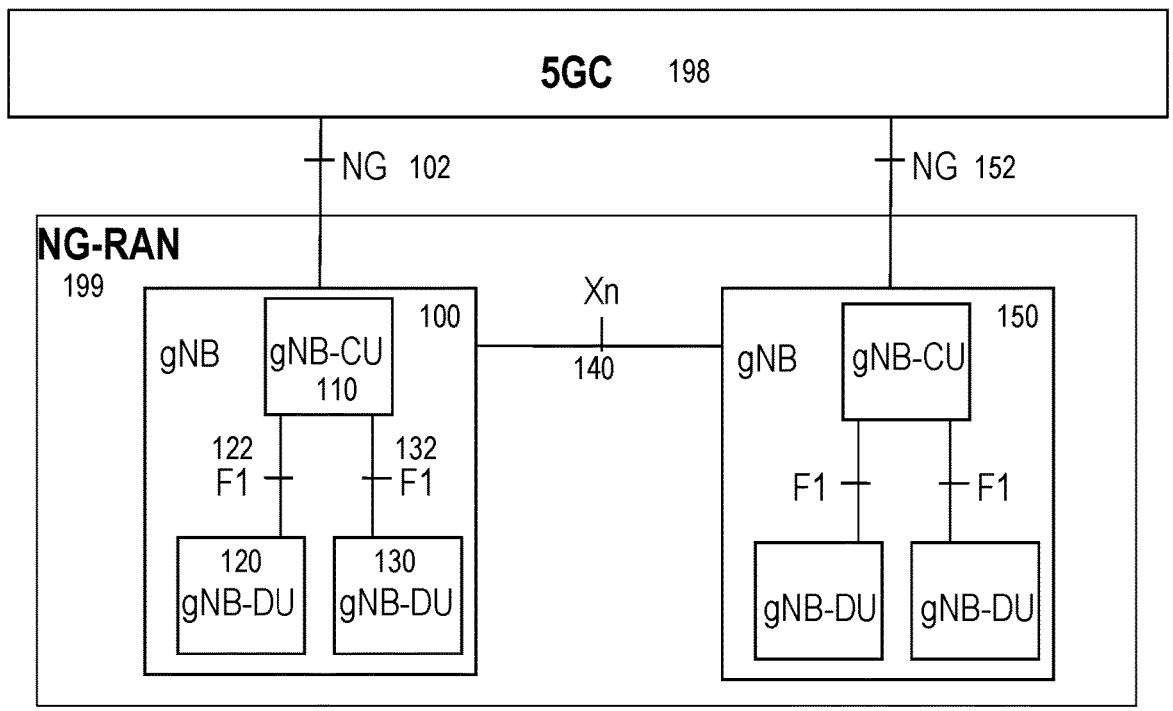
FIGS. 1-2 illustrate various aspects of an exemplary 5G network architecture.

Embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Service: As used herein, the term "service" refers generally to a set of data, associated with one or more applications, that is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

Figure 2:
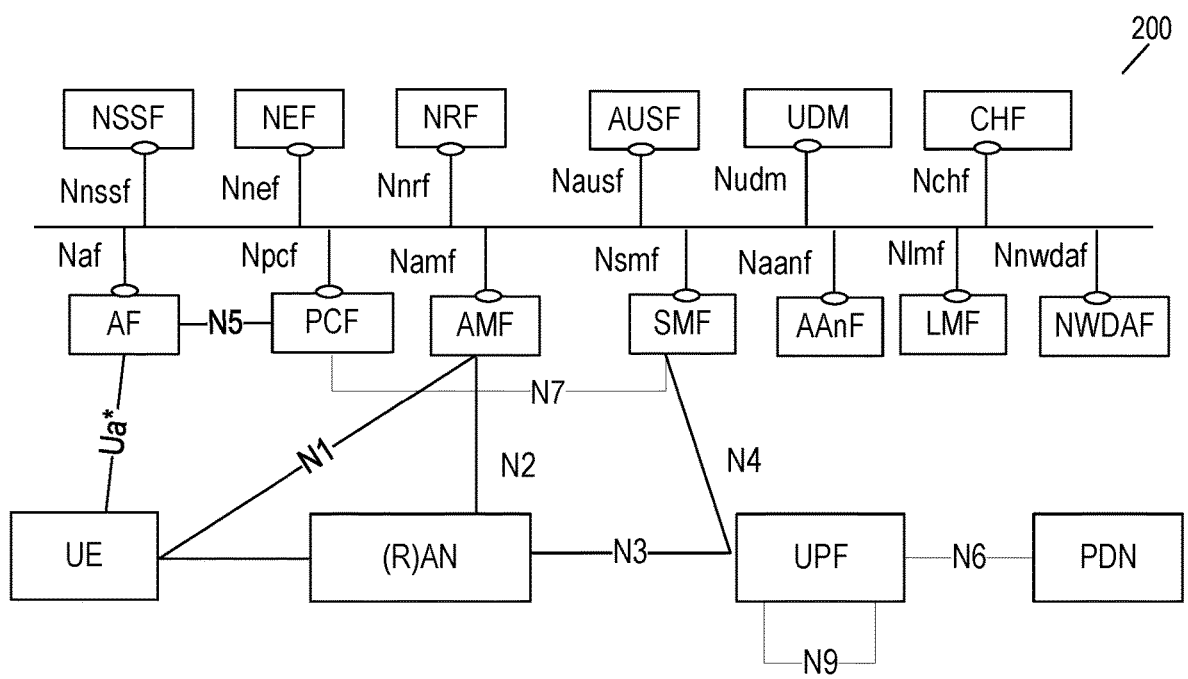

As briefly mentioned above, there are various problems, issues, and/or difficulties that can occur when using access tokens for data collection via the Data Management Framework proposed for 3GPP Rel-17, particularly when the optional messaging framework is not used. These are discussed in more detail below after the following description of the 5G SBA. FIG. 2 shows an exemplary architecture of a 5G network (200) with service-based interfaces. The architecture shown in FIG. 2 includes the following NFs:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)— supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface— acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Network Data Analytics Function (NWDAF) with Nnwdaf interface—provides network analytics information (e.g., statistical information of past events and/or predictive information) to other NFs on a network slice instance level.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

As mentioned above, 3GPP Rel-17 enhances the SBA by adding a Data Management Framework that includes a Data Collection Coordination Function (DCCF) and a messaging framework, which is defined in detail in 3GPP TR 23.700-91 (v17.0.0) section 6.9. The Data Management Framework is backward compatible with a Rel-16 NWDAF function, described above. For Rel-17, the baseline for services offered by the DCCF (e.g., to an NWDAF Analytics Function) are the Rel-16 NF Services used to obtain data. For example, the baseline for the DCCF service used by an NWDAF consumer to obtain UE mobility data is Namf EventExposure.

A Rel-16 NWDAF can coexist with a Rel-17 NWDAF and the Data Management Framework. A Rel-16 NWDAF continues to request data directly from NFs without using the Data Management Framework and provides analytics to consumers that discover the Rel-16 NWDAF. A Rel-17 NWDAF can request data from the Data Management Framework, and if the data is not collected already, the Data Management Framework would request the data from a data source. In other words, a data source would independently send Data to the Rel-16 NWDAF that sent a request directly to the data Source, and to the Data Management Framework that sent a request for the Rel-17 NWDAF.

In Rel-17, the NWDAF is decomposed by moving Data Collection (including the task of identifying the Data Source) to the Data Management Framework. The Rel-17 NWDAF requests data from the Data Management Framework but may not query other NFs (e.g., NRF, UDM, etc.) to determine which NF instance serves a UE, nor need it be concerned about life cycles of Data Source NFs, as was the case for Rel-16 NWDAF. This decomposition also allows other NFs to obtain data via the Data Management Framework and avoids duplicate data collection from the same data source. The Rel-17 NWDAF (without Data Collection) may be referred to as the "NWDAF Analytics Function."

Figure 3:
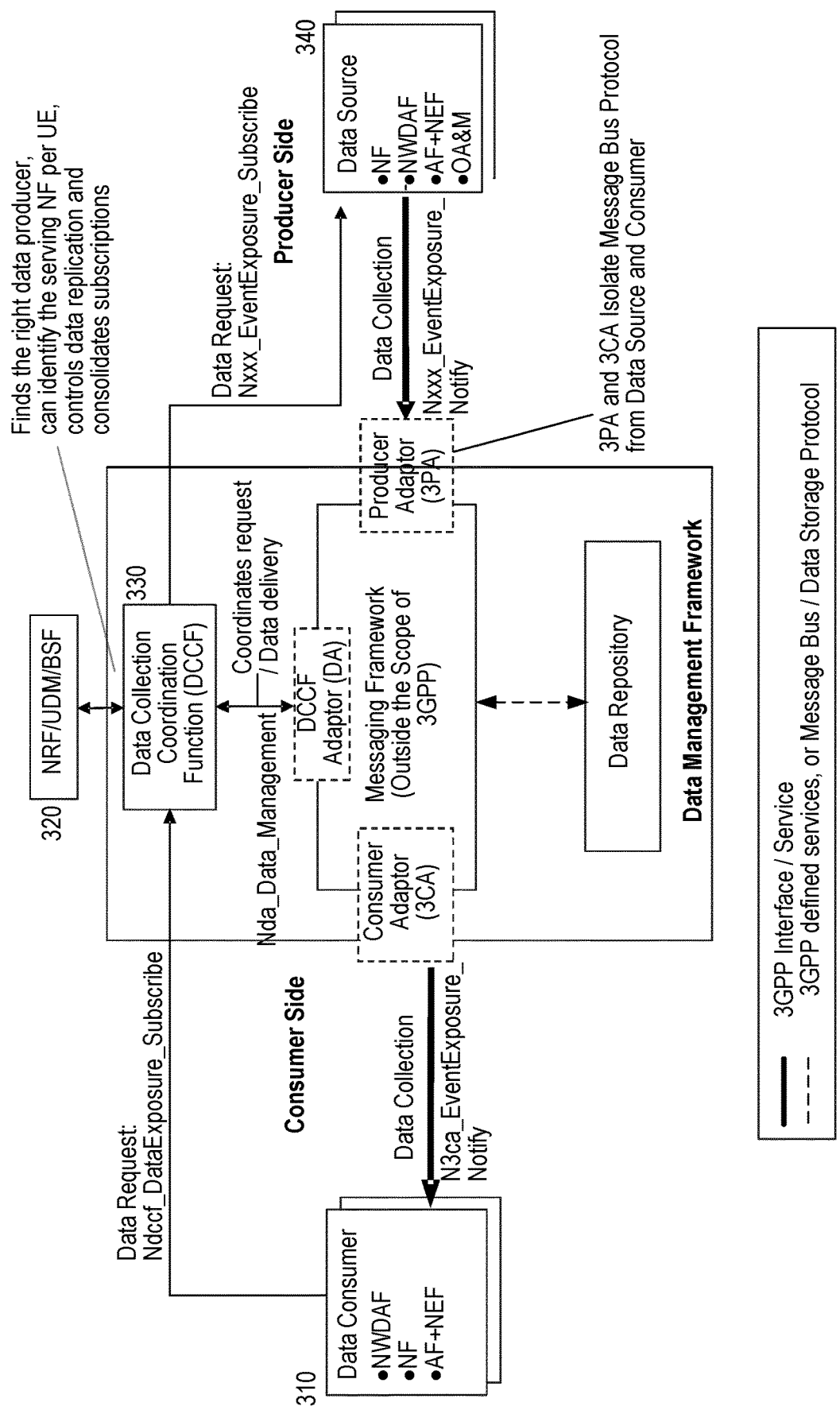
FIG. 3 illustrates a high-level view of the 3GPP Rel-17 Data Management Framework.

FIG. 3 illustrates a high-level view of the Rel-17 Data Management Framework. The main components are the DCCF (330) that communicates with other NFs; the Messaging Framework, which is outside the scope of 3GPP standardization; and a Data Repository. The DCCF optionally includes a DCCF Adaptor (DA) used to communicate with the Messaging Framework, which optionally includes a Consumer Adaptor (3CA) and/or a Producer Adaptor (3PA) used to communicate with a Data Consumer (310) and a Data Source (340), respectively. The DA, 3CA, and 3PA may be standalone or combined with the DCCF, Data Consumer, and Data Source, respectively. Exemplary Data Consumers include the NWDAF Analytics Function an NF requesting analytics, but as with other NF services, nothing precludes other Consumer NFs. The Data Management Framework is compatible with both a 3GPP-defined Data Repository Function for ML/Analytics and Data Repositories that are not 3GPP-defined.

DCCF is a control-plane function that coordinates data collection and triggers data delivery to Data Consumers. A DCCF may support multiple Data Sources, Data Consumers, and Message Frameworks. However, to prevent duplicate data collection, each Data Source is associated with only one DCCF. DCCF provides the 3GPP defined Ndccf_DataExposure Service to Data Consumers and uses the services of Data Sources to obtain data. Although FIG. 3 shows one DCCF for the 5GC, there can be multiple DCCF instances associated with different network slices, different geographic regions where Data Sources reside, or different types of Data Sources. A DCCF registers with NRF and is discovered by Consumers (or SCP) using the registration and discovery procedures defined for the NF Service Framework in 3GPP TS 23.502 (v16.7.0).

DCCF receives data requests from Data Consumers via the Ndccf_DataExposure service. If a Data Source is not specified in the Data Request, DCCF determines the Data Source that can provide the data requested by the Data Consumer. For example, if the request is for UE-specific data, DCCF may query the other NFs (320, e.g., NRF, UDM, etc.) to determine which NF instance is serving the UE. If the Data Source is specified in the Data Request (e.g., the Data Consumer is configured with Data Sources), DCCF checks whether the data is already collected from the Data Source. If not, DCCF will request the data from the specified Data Source.

Additionally, DCCF may determine if the requested data is currently being produced by any Data Source and being provided to the Messaging Framework. If the requested data is not being produced and/or provided, DCCF sends a new subscription/request towards the Data Source to trigger a new data collection, and DCCF then subscribes with the messaging framework for the Data Consumer to receive future notifications associated with the desired Data Source.

As mentioned above, token-based authorization is defined in 3GPP TS 33.501 (e.g., v17.1.0). This mechanism involves a consumer for a NF service (referred to as "NF Service Consumer" or more simply "Service Consumer") obtaining an access token for the desired service from an authorization server before accessing the service. Access tokens are a type of JSON Web Tokens described in Internet Engineering Task Force (IETF) publication RFC 7519. Access tokens are secured with digital signatures or Message Authentication Codes (MAC) based on JSON Web Signature (JWS) as described in IETF RFC 7515.

Figure 4:
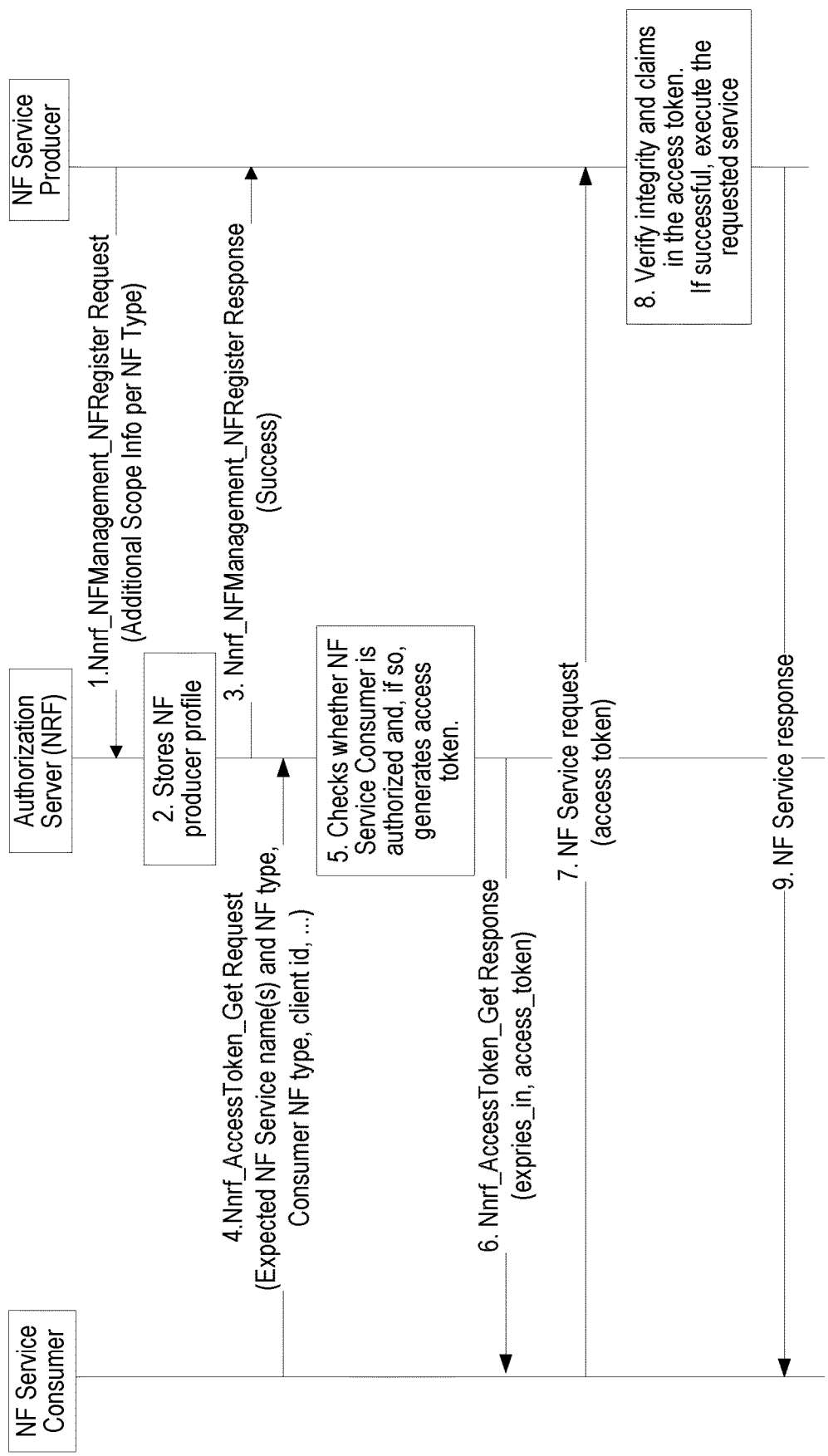
FIGS. 4-5 are signal flow diagrams illustrating two different techniques for token-based authorization for access to 5G network function (NF) services.

FIG. 4 shows a signal flow diagram illustrating token-based authorization for access to NF services. Operations 1-3 are part of the NF Service registration procedure in which the NF Service Producer provides information about the NF Service to the NRF, which stores this information in a NF producer profile. The service information may identify resources and actions (or service operations) that are allowed for NF Service Consumers.

In operation 4, an NF Service Consumer requests an access token from the NRF using the NnrfAccessToken_Get Request operation. The message includes the NF Instance ID(s) of the NF Service Consumer, the requested "scope" including the expected NF Service name(s), optionally "additional scope" information (e.g., requested resources and requested service operations on the resources), and NF types of the expected NF Service Producer instance and of the NF Service Consumer.

In operation 5, the NRF checks whether the NF Service Consumer is authorized to access the requested service(s). If the NF Service Consumer is authorized, the NRF generates an access token with appropriate claims included. The NRF digitally signs the generated access token based on a shared secret or private key as described in RFC 7515 published by IETF. If the NF Service Consumer is not authorized, the NRF does not issue the access token. In operation 6, the NRF sends the access token to the NF Service Consumer in an Nnrf AccessToken Get Response operation.

In operation 7, the NF Service Consumer requests service from the NF Service Producer and includes the obtained access token with the request. In operation 8, the NF Service Producer verifies the access token integrity and claims within the access token. If successful, the NF Service Producer provides the requested service to the NF Service Consumer in operation 9.

Figure 5:
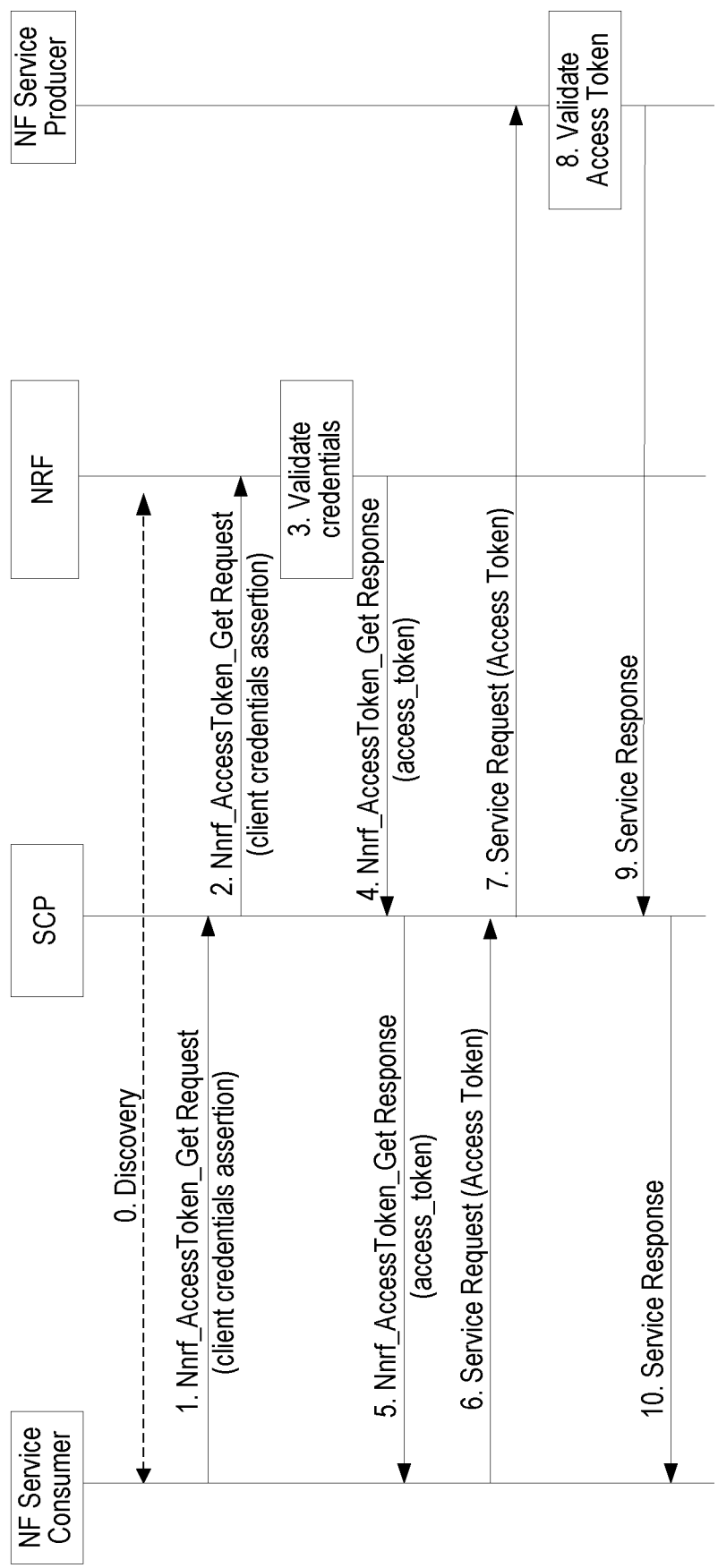

As mentioned above, indirect communication in the SBA was specified in 3GPP Rel-16, using an SCP as a standardized proxy between Service Consumers and Service Producers. With respect to token-based authorization, Rel-16 added the capability for an SCP to request access tokens on behalf of Service Consumers. FIG. 5 shows a signal flow diagram illustrating token-based authorization for access to NF services using an SCP. A notable difference from FIG. 4 is that the NF Service Consumer obtains both the service access token and the service itself using the SCP as an intermediary.

SCP-type functionality can also be used in association with DCCF implementations. For example, DCCF can request access tokens (for data access/collection) from NRF on behalf of the consumers. NRF provides the token to DCCF if the consumers are authorized to collect the requested data. Then, DCCF coordinates the request optionally using the messaging framework. More specifically, when DCCF receives a request for data collection, DCCF identifies the Data Producer NF that can provide the requested data and requests authorization from NRF to invoke services supported by the identified Data Producer(s) that are needed to retrieve the data. One issue is that in the authorization request does not provide NRF with information about the identity of the NF Service Consumer that requested the data.

One possible solution is to allow the DCCF to include, in the authorization request to the NRF, the authorization token provided by the NF Service Consumer in the service request to the DCCF. In addition, the NF Service Consumer can include a Client Credentials Assertion (CCA) token that can be used by the NRF to verify the identity of the NF Service Consumer.

Figure 6:
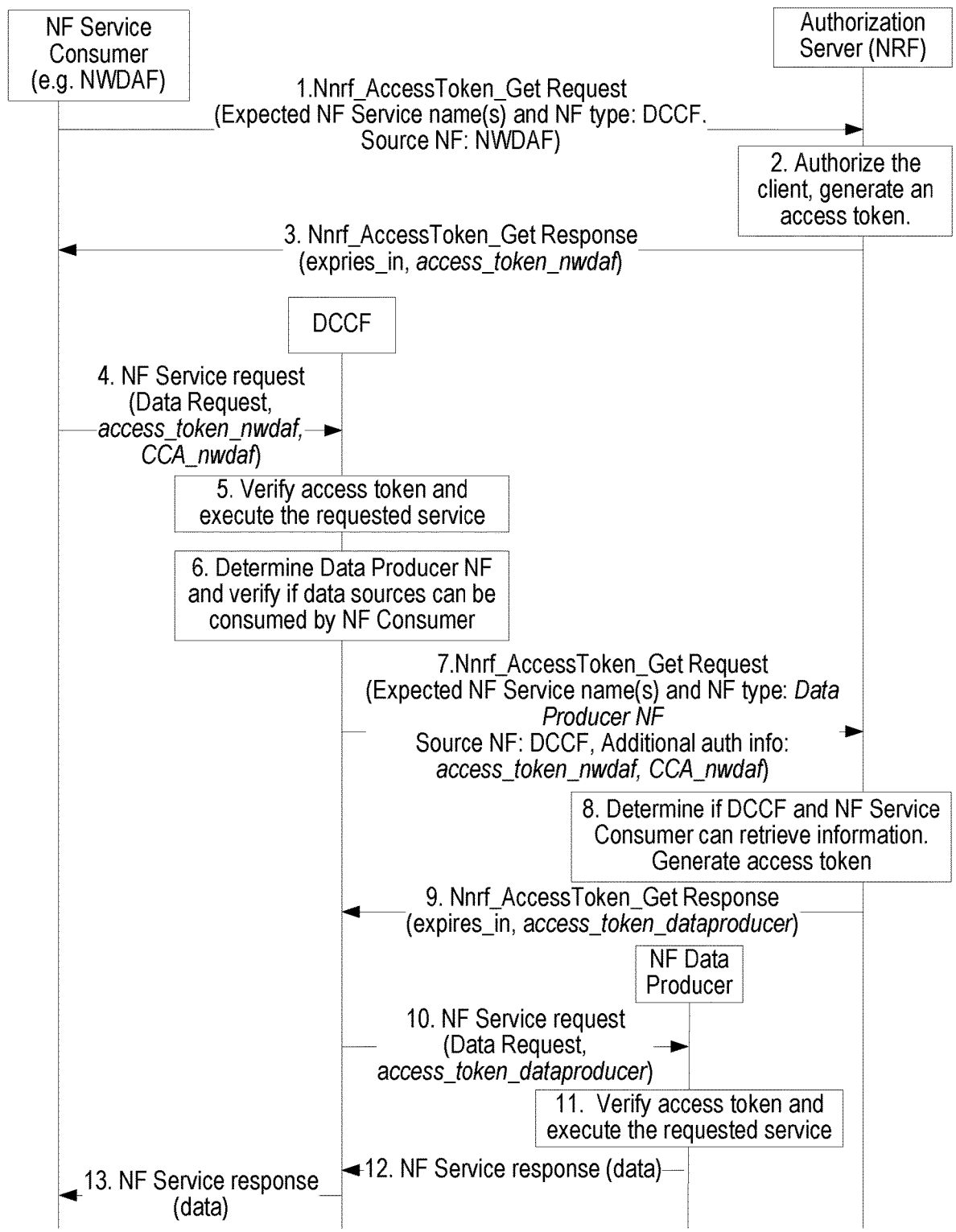
FIG. 6 is a signal flow diagram illustrating NF Service Consumer authorization for a data collection coordination function (DCCF)—selected Service Producers in accordance conventional techniques.

FIG. 6 shows a signal flow diagram illustrating NF Service Consumer authorization for DCCF-selected Service Producers in accordance with this possible solution. In operation 1, a NF Service Consumer (e.g., NWDAF) discovers a DCCF to retrieve data. The NF Service Consumer requests authorization from an NRF by invoking an Nnrf AccessToken_Get request including the information to identify the target NF (i.e., DCCF) and the source NF. In operation 2, the NRF authorizes the request and generates an access token as further described in 3GPP TS 33.501 (v17.1.0). In operation 3, the access token (access token_nwdaf) is provided to the NF Service Consumer.

In operation 4, the NF Service Consumer initiates an NF service request to DCCF and includes the access_token_nwdaf. The NF Service Consumer also generates a CCA token (CCA_nwdaf) as described in 3GPP TS 33.501 (v17.1.0) and includes it in the request message in order to authenticate itself towards the NRF when the request is sent via DCCF. From NF Service Consumer perspective, the NF Service Producer is DCCF and end point is NRF, both included in CCA_nwdaf. In operation 5, DCCF verifies that the access_token_nwdaf is valid and executes the service.

In operation 6, DCCF determines that the requested service is provided by different NF Service Producer(s). Since the service is provided by different NF(s), DCCF verifies that the NF Service Consumer can access (indirectly) the services provided by the identified NF Service Producer(s). In operation 7, DCCF requests authorization from the NRF by invoking an Nnrf AccessToken_Get request including the information to identify the target NF (NF Service Producer) and the source NF (DCCF), as well as access_token_nwdaf, and CCA_nwdaf provided by the NF Service Consumer. For indirect communications, DCCF may also include its own CCA, if there is SCP in between DCCF and NRF.

In operation 8, based on access_token_nwdaf and CCA_nwdaf, NRF determines whether the DCCF and the NF Service Consumer are allowed to access the service provided by the identified NF Service Producers. In operation 9, NRF generates and provides an access token to DCCF as described in 3GPP TS 33.501 (v17.1.0). In operation 10, DCCF uses the access token to initiate an NF service request for the data to the identified NF Service Producer. If DCCF determines that the service consumer is not allowed to use the service of the data producer, then DCCF does not instruct the MF to collect data from the data producer.

In operation 11, the NF Service Producer(s) verify the access token and execute(s) the service. In operation 12, the NF Service Producer(s) provide requested data in the response to the request of operation 10. In operation 13, DCCF forwards the data received in operation 12 to the NF Service Consumer in the response to the request of operation 4.

Even so, there are various problems, issues, and/or difficulties with arrangements such as the one illustrated by FIG. 6. For example, two access token requests need to be sent to the NRF in relation to the same DCCF service request: one by the consumer for access to the DCCF service, and one by the DCCF for access to the data on behalf of the consumer. Additionally, the two access tokens need to be signed by the NRF and verified—one by the data source or DCCF, and the other by DCCF. In addition, these arrangements require the NF Service Consumer to use CCA (defined in SBA) to facilitate its authentication by DCCF. These requirements can be burdensome on DCCF implementations.

Embodiments of the present disclosure address these and other problems, issues, and/or difficulties by providing novel, flexible, and efficient techniques for data collection authorization when a DCCF is used and the associated messaging framework is not used. More specifically, when a Data Consumer requests an access token for a DCCF service request, the Data Consumer can also request another access token for a corresponding data collection request. Instead of providing multiple access tokens for the request, the NRF can provide a single (e.g., merged or composite) access token that includes authorization request results for both the DCCF service request and the data collection request. These techniques reduce the number of tokens generated and the amount of signaling and workload for NRF. Moreover, these techniques do not require use of CCA.

In some embodiments, when the Data Consumer requests a first token for a DCCF service request, the Data Consumer can also request a second token for a data collection request. Instead of providing multiple tokens as requested, NRF provides a single token that includes all authorization request results, i.e., for DCCF service request and data collection request(s). In other embodiments, instead of requesting tokens on behalf of the Data Consumer, DCCF can directly check the authorization such that there is no need to generate an additional token. These embodiments are described in more detail below.

Figure 7:
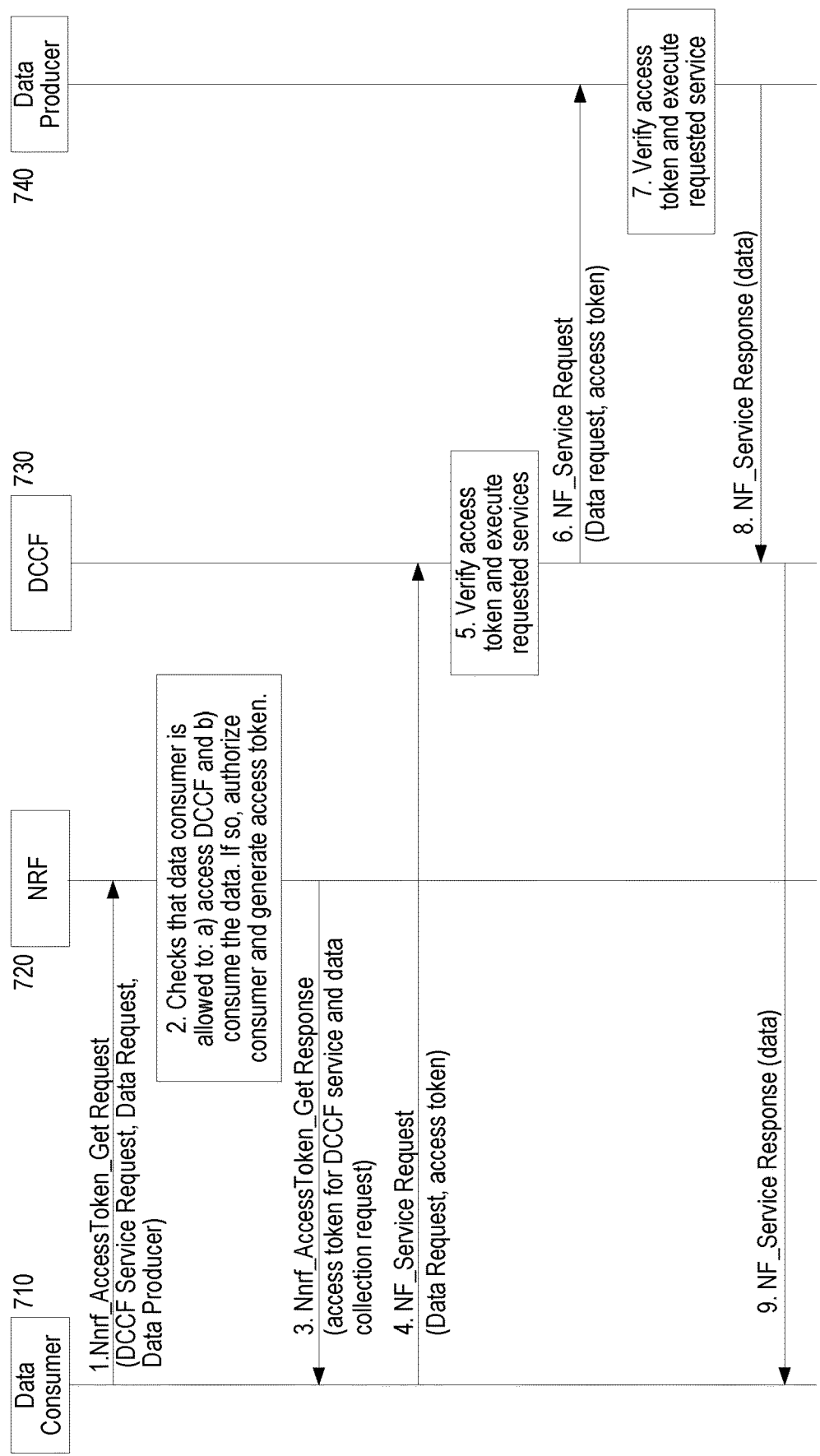
FIG. 7 is a signal flow diagram of an exemplary procedure for a Data Consumer NF to obtain data from a Data Producer NF in a 5G network via a DCCF (without messaging framework), according to various embodiments of the present disclosure.

FIG. 7 is a flow diagram of an exemplary procedure for a Data Consumer NF to obtain data from a Data Producer NF in a 5G network via DCCF, according to some embodiments of the present disclosure. In particular, the procedure in FIG. 7 involves a Data Consumer (710), an NRF (720), a DCCF (730), and a Data Producer (740). For brevity, these elements and/or functions will be referred to in the following description without their respective reference numbers. Although operations shown in FIG. 7 are given numerical labels, this is intended to facilitate explanation rather to imply any strict ordering of the operations, unless specifically stated otherwise.

In operation 1, the Data Consumer sends an Nnrf Access-Token_GetRequest message to NRF to obtain an access token for the DCCF service and for data collection. In the message, the Data Consumer includes a name or identifier of the DCCF service, information about data requested (e.g., an identifier), and any available information about the Data Producer (e.g., service name, NF instance ID, etc.).

In operation 2, NRF verifies that the Data Consumer is allowed to access the DCCF service and also that the Data Consumer is allowed to consume/collect the identified data. If the received request does not identify the Data Producer, the NRF may identify a Data Producer (e.g., 740) that can provide the identified data to the Data Consumer and/or that the Data Consumer is authorized to access. If successful, the NRF generates an access token that includes the following information:

DCCF ID;
name (or ID) of DCCF service (e.g., Nf_Service Request);
Data Producer ID;
name (or ID) of Data Producer service; and
identifier of the data to be collected.

In operation 3, NRF sends the access token with the above information to the Data Consumer using Nnrf AccessToken_GetResponse. In operation 4, the Data Consumer sends the received access token to in using Nf_Service Request. In operation 5, DCCF verifies the access token and checks the authorization result. If the access token indicated both that the Data Consumer is allowed to get services from DCCF and that the Data Consumer is allowed to collect the identified data, DCCF coordinates the data collection request. DCCF may also cache the received token for future use.

In operation 6, DCCF sends the merged access token to the Data Producer to retrieve the data, using NF Service Request. Since the access token also includes the authorization of the Data Consumer for getting service from DCCF, the Data Producer can identify and/or ensure that the Data Consumer has initiated this data request. Note that this operation removes the need of CCA as required by conventional techniques. In operation 7, the Data Producer verifies the access token and executes the service.

In operation 8, the Data Producer sends an Nf_Service Response with the requested data to DCCF. In operation 9, DCCF forwards the data to the Data Consumer in an Nf_Service Response to the request in operation 4.

In a variant of the embodiments illustrated in FIG. 7, the Data Consumer can request separate access tokens for the DCCF service and for the data collection requests (operation 1). The NRF generates the two tokens (operation 2) and sends them to the consumer (operation 3). A first token states that the Data Consumer can access the DCCF service and a second token states that the Data Consumer can consume the identified data from a specific Data Producer NF instance (if such exists).

Upon receiving the two tokens (operation 4), DCCF verifies the tokens and checks the authorization result (operation 5). If the consumer is allowed to get services from DCCF and access the data, DCCF coordinates the data collection request. DCCF sends both access tokens to the Data Producer (operation 6), which can use the two tokens to verify that the Data Consumer has initiated the data request.

Figure 8:
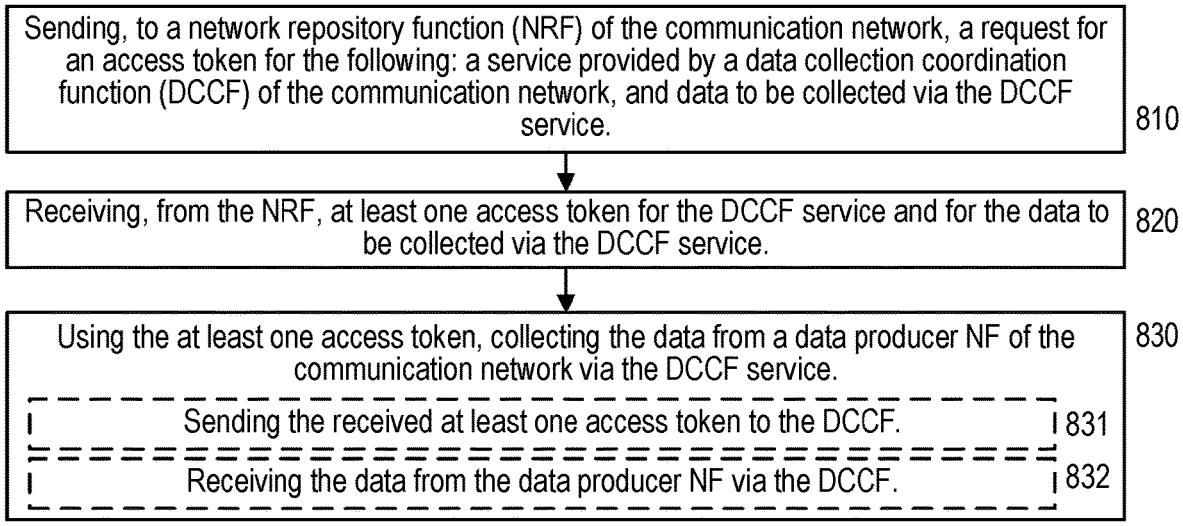
FIG. 8 shows an exemplary method (e.g., procedure) for a data consumer NF of a communication network, according to various embodiments of the present disclosure.
Figure 9:
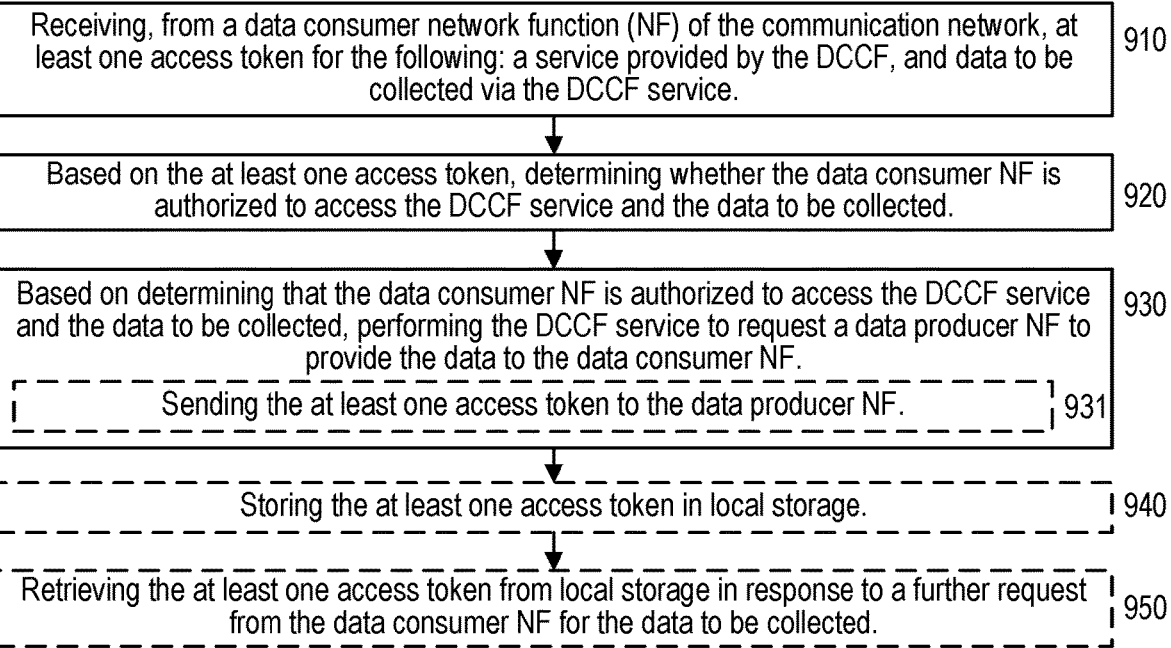
FIG. 9 shows an exemplary method (e.g., procedure) for a DCCF of a communication network, according to various embodiments of the present disclosure.
Figure 10:
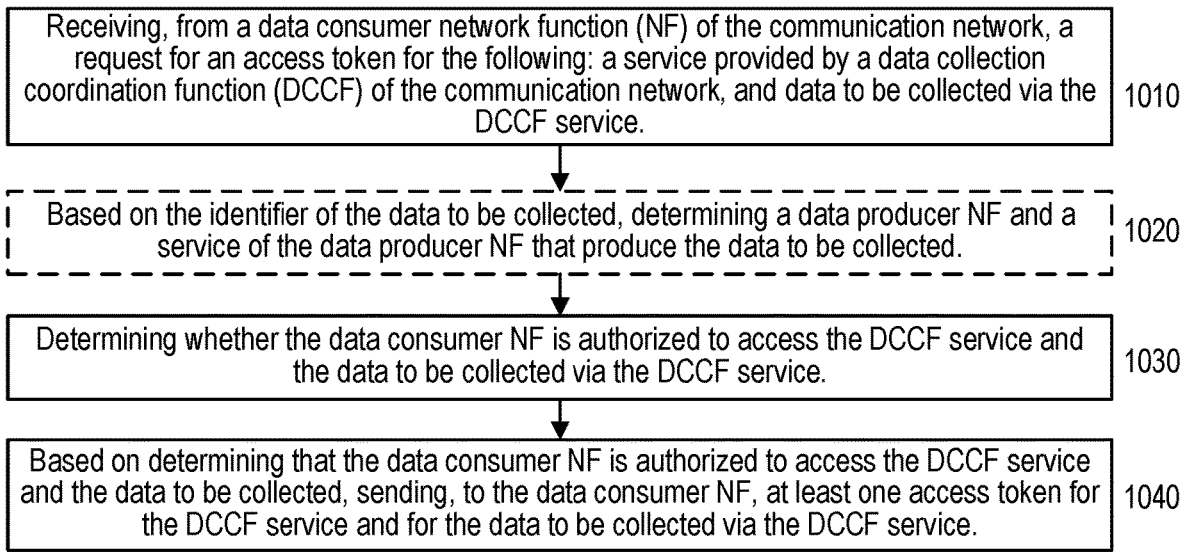
FIG. 10 shows an exemplary method (e.g., procedure) for an NRF of a communication network, according to various embodiments of the present disclosure.

These embodiments described above can be further illustrated with reference to FIGS. 8-10, which depict exemplary methods (e.g., procedures) for a data consumer NF, a DCCF, and an NRF, respectively. Put differently, various features of the operations described below correspond to various embodiments described above. The exemplary methods shown in FIGS. 8-10 can be used cooperatively (e.g., with each other and with other procedures described herein) to provide benefits, advantages, and/or solutions to problems described herein. Although the exemplary methods are illustrated in FIGS. 8-10 by specific blocks in particular orders, the operations corresponding to the blocks can be performed in different orders than shown and can be combined and/or divided into blocks and/or operations having different functionality than shown. Optional blocks and/or operations are indicated by dashed lines.

More specifically, FIG. 8 illustrates an exemplary method (e.g., procedure) for a data consumer NF of a communication network (e.g., 5GC), according to various embodiments of the present disclosure. The exemplary method shown in FIG. 8 can be performed by various NFs (or network nodes hosting the same) such as described elsewhere herein.

The exemplary method can include the operations of block 810, where the data consumer NF can send, to an NRF of the communication network, a request for an access token for the following: a service provided by a DCCF of the communication network, and data to be collected via the DCCF service. The exemplary method can also include the operations of block 820, where the data consumer NF can receive, from the NRF, at least one access token for the DCCF service and for the data to be collected via the DCCF service. The exemplary method can also include the operations of block 830, where using the at least one access token, the data consumer NF can collect the data from a data producer NF in the communication network via the DCCF service.

In some embodiments, the collecting operations of block 830 can include the operations of sub-blocks 831-832, where the data consumer NF can send the received at least one access token to the DCCF and receive the data from the data producer NF via the DCCF.

In various embodiments, the request for the access token (e.g., in block 810) can include a name or identifier of the DCCF service and an identifier of the data to be collected. In some of these embodiments, the request for an access token can also include one or more of the following: an identifier of the data producer NF, and an identifier of a service that produces the data to be collected.

In some embodiments, a single access token can be received from the NRF (e.g., in block 820) and sent to the DCCF. In such embodiments, the single access token includes an identifier of the DCCF, an identifier of the DCCF service, an identifier of the data producer NF, an identifier of a service of the data producer NF, and an identifier of the data to be collected.

In other embodiments, first and second access tokens are received from the NRF and sent to the DCCF. In such embodiments, the first access token includes an identifier of the DCCF and an identifier of the DCCF service, while the second access token includes an identifier of the data producer NF, an identifier of a service of the data producer NF, and an identifier of the data to be collected.

In some embodiments, the at least one access token indicates that the data consumer NF is authorized to access the DCCF service and that the data consumer NF is authorized to access the data to be collected.

In addition, FIG. 9 illustrates an exemplary method (e.g., procedure) for a DCCF of a communication network (e.g., 5GC), according to various embodiments of the present disclosure. The exemplary method shown in FIG. 9 can be performed by a DCCF (or network node hosting the same) such as described elsewhere herein.

The exemplary method can include the operations of block 910, where the DCCF can receive, from a data consumer NF of the communication network, at least one access token for the following: a service provided by the DCCF, and data to be collected via the DCCF service. The exemplary method can also include the operations of block 920, where based on the at least one access token, the DCCF can determine whether the data consumer NF is authorized to access the DCCF service and the data to be collected. The exemplary method can also include the operations of block 930, where based on determining that the data consumer NF is authorized to access both the DCCF service and the data to be collected (e.g., in block 920), the DCCF can perform the DCCF service to request a data producer NF to provide the data to the data consumer NF.

In some embodiments, a single access token can be received from the data consumer NF (e.g., in block 910) and includes the following: an identifier of the DCCF, an identifier of the DCCF service, an identifier of the data producer NF, an identifier of a service of the data producer NF, and an identifier of the data to be collected.

In other embodiments, first and second access tokens can be received from the data consumer NF (e.g., in block 910). In such embodiments, the first access token includes an identifier of the DCCF and an identifier of the DCCF service, while the second access token includes an identifier of the data producer NF, an identifier of a service of the data producer NF, and an identifier of the data to be collected.

In some embodiments, the at least one access token indicates that the data consumer NF is authorized to access the DCCF service and that the data consumer NF is authorized to access the data to be collected.

In some embodiments, performing the DCCF service (e.g., in block 930) can include the operations of sub-block 931, where the DCCF can send the at least one access token to the data producer NF.

In some embodiments, the exemplary method can also include the operations of blocks 940-950, where the DCCF can store (e.g., cache) the at least one access token in local storage and subsequently retrieve the at least one access token from local storage in response to a further request from the data consumer NF for the data to be collected.

In addition, FIG. 10 illustrates an exemplary method (e.g., procedure) for an NRF of a communication network (e.g., 5GC), according to various embodiments of the present disclosure. The exemplary method shown in FIG. 10 can be performed by an NRF (or network node hosting the same) such as described elsewhere herein.

The exemplary method can include the operations of block 1010, where the NRF can receive, from a data consumer NF of the communication network, a request for an access token for the following: a service provided by a DCCF of the communication network, and data to be collected via the DCCF service. The exemplary method can also include the operations of block 1030, where the NRF can determine whether the data consumer NF is authorized to access the DCCF service and the data to be collected via the DCCF service. The exemplary method can also include the operations of block 1040, where based on determining that the data consumer NF is authorized to access the DCCF service and the data to be collected (e.g., in block 1030), the NRF can send to the data consumer NF at least one access token for the DCCF service and for the data to be collected via the DCCF service.

In some embodiments, the request for an access token (e.g., in block 1010) can include a name or identifier of the DCCF service and an identifier of the data to be collected. In some of these embodiments, the request for an access token also includes one or more of the following: an identifier of a data producer NF that produces the data to be collected, and an identifier of a service that produces the data to be collected. In other of these embodiments, the exemplary method can also include the operations of block 1020, where the NRF can determine a data producer NF and a service of the data producer NF that produce the data to be collected, based on the identifier of the data to be collected (i.e., in the request).

In some embodiments, a single access token can be sent to the data consumer NF (e.g., in block 1040) and includes the following: an identifier of the DCCF, an identifier of the DCCF service, an identifier of the data producer NF, an identifier of a service of the data producer NF, and an identifier of the data to be collected.

In other embodiments, first and second access tokens can be sent to the data consumer NF (e.g., in block 1040). In such embodiments, the first access token includes an identifier of the DCCF and an identifier of the DCCF service, while the second access token includes an identifier of the data producer NF, an identifier of a service of the data producer NF, and an identifier of the data to be collected.

In some embodiments, the at least one access token indicates that the data consumer NF is authorized to access the DCCF service and that the data consumer NF is authorized to access the data to be collected.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 11:
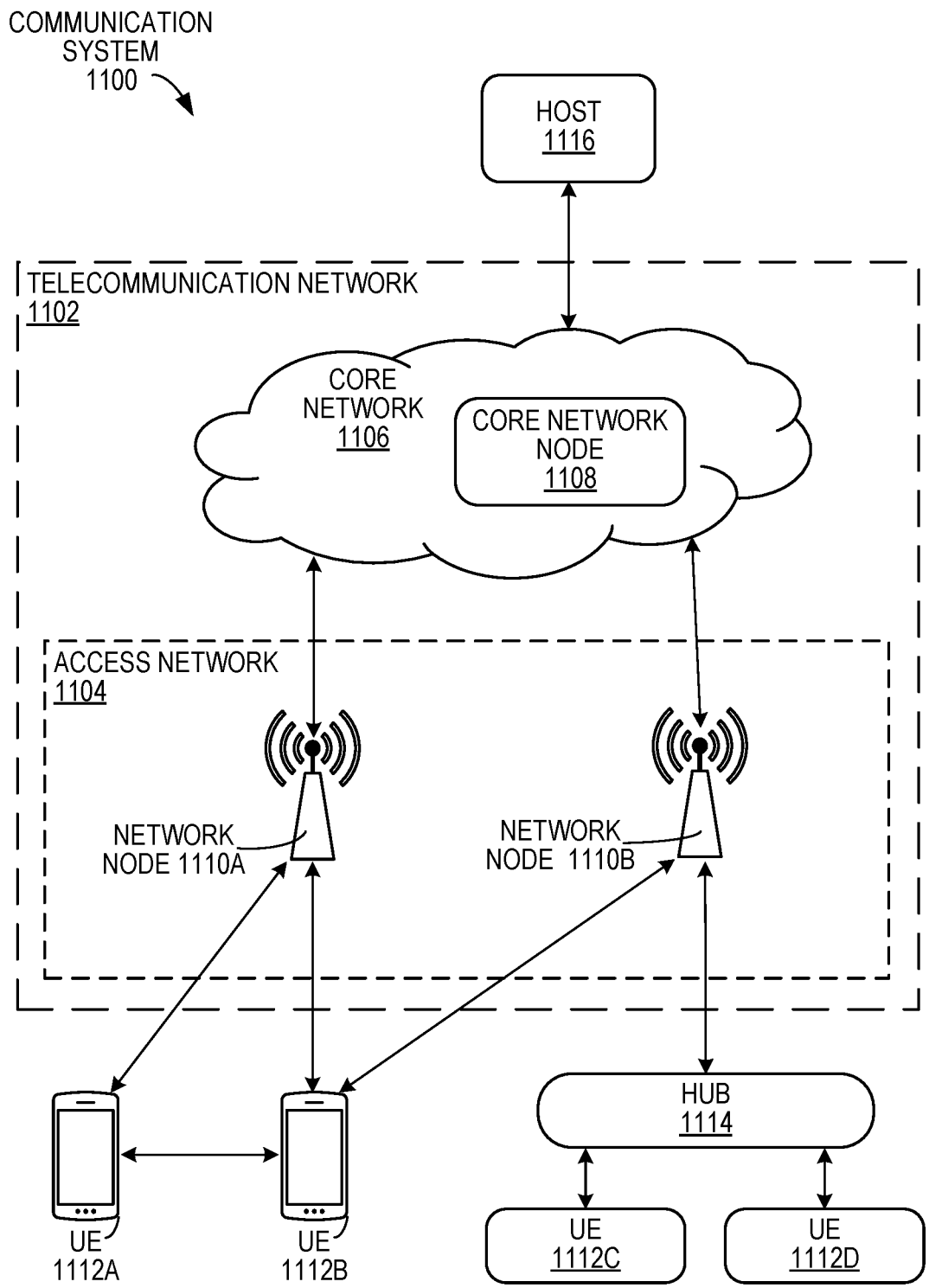
FIG. 11 shows a communication system according to various embodiments of the present disclosure.

FIG. 11 shows an example of a communication system 1100 in accordance with some embodiments. In this example, the communication system 1100 includes a telecommunication network 1102 that includes an access network 1104, such as a radio access network (RAN), and a core network 1106, which includes one or more core network nodes 1108. The access network 1104 includes one or more access network nodes, such as network nodes 1110*a* and 1110*b* (one or more of which may be generally referred to as network nodes 1110), or any other similar $3^{rd}$ Generation Partnership Project (3GPP) access node or non-3GPP access point. The network nodes 1110 facilitate direct or indirect connection of user equipment (UE), such as by connecting UEs 1112*a*, 1112*b*, 1112*c*, and 1112*d* (one or more of which may be generally referred to as UEs 1112) to the core network 1106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1100 may include any number of wired or wireless networks, network nodes, UEs, and/or any other components or systems that may facilitate or participate in the communication of data and/or signals whether via wired or wireless connections. The communication system 1100 may include and/or interface with any type of communication, telecommunication, data, cellular, radio network, and/or other similar type of system.

The UEs 1112 may be any of a wide variety of communication devices, including wireless devices arranged, configured, and/or operable to communicate wirelessly with the network nodes 1110 and other communication devices. Similarly, the network nodes 1110 are arranged, capable, configured, and/or operable to communicate directly or indirectly with the UEs 1112 and/or with other network nodes or equipment in the telecommunication network 1102 to enable and/or provide network access, such as wireless network access, and/or to perform other functions, such as administration in the telecommunication network 1102.

In the depicted example, the core network 1106 connects the network nodes 1110 to one or more hosts, such as host 1116. These connections may be direct or indirect via one or more intermediary networks or devices. In other examples, network nodes may be directly coupled to hosts. The core network 1106 includes one more core network nodes (e.g., core network node 1108) that are structured with hardware and software components. Features of these components may be substantially similar to those described with respect to the UEs, network nodes, and/or hosts, such that the descriptions thereof are generally applicable to the corresponding components of the core network node 1108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), Network Repository Function (NRF), Data Collection Coordination Function (DCCF), and/or a User Plane Function (UPF).

The host 1116 may be under the ownership or control of a service provider other than an operator or provider of the access network 1104 and/or the telecommunication network 1102 and may be operated by the service provider or on behalf of the service provider. The host 1116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1100 of FIG. 11 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); LTE and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 (also known as WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1102 is a cellular network that implements 3GPP standardized features. Accordingly, the telecommunications network 1102 may support network slicing to provide different logical networks to different devices that are connected to the telecommunication network 1102. For example, the telecommunications network 1102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1112 are configured to transmit and/or receive information without direct human interaction. For instance, a UE may be designed to transmit information to the access network 1104 on a predetermined schedule, when triggered by an internal or external event, or in response to requests from the access network 1104. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio—Dual Connectivity (EN-DC).

In the example, the hub 1114 communicates with the access network 1104 to facilitate indirect communication between one or more UEs (e.g., UE 1112c and/or 1112d) and network nodes (e.g., network node 1110b). In some examples, the hub 1114 may be a controller, router, content source and analytics, or any of the other communication devices described herein regarding UEs. For example, the hub 1114 may be a broadband router enabling access to the core network 1106 for the UEs. As another example, the hub 1114 may be a controller that sends commands or instructions to one or more actuators in the UEs. Commands or instructions may be received from the UEs, network nodes 1110, or by executable code, script, process, or other instructions in the hub 1114. As another example, the hub 1114 may be a data collector that acts as temporary storage for UE data and, in some embodiments, may perform analysis or other processing of the data. As another example, the hub 1114 may be a content source. For example, for a UE that is a VR headset, display, loudspeaker or other media delivery device, the hub 1114 may retrieve VR assets, video, audio, or other media or data related to sensory information via a network node, which the hub 1114 then provides to the UE either directly, after performing local processing, and/or after adding additional local content. In still another example, the hub 1114 acts as a proxy server or orchestrator for the UEs, in particular in if one or more of the UEs are low energy IoT devices.

The hub 1114 may have a constant/persistent or intermittent connection to the network node 1110b. The hub 1114 may also allow for a different communication scheme and/or schedule between the hub 1114 and UEs (e.g., UE 1112c and/or 1112d), and between the hub 1114 and the core network 1106. In other examples, the hub 1114 is connected to the core network 1106 and/or one or more UEs via a wired connection. Moreover, the hub 1114 may be configured to connect to an M2M service provider over the access network 1104 and/or to another UE over a direct connection. In some scenarios, UEs may establish a wireless connection with the network nodes 1110 while still connected via the hub 1114 via a wired or wireless connection. In some embodiments, the hub 1114 may be a dedicated hub—that is, a hub whose primary function is to route communications to/from the UEs from/to the network node 1110b. In other embodiments, the hub 1114 may be a non-dedicated hub—that is, a device which is capable of operating to route communications between the UEs and network node 1110b, but which is additionally capable of operating as a communication start and/or end point for certain data channels.

Figure 12:
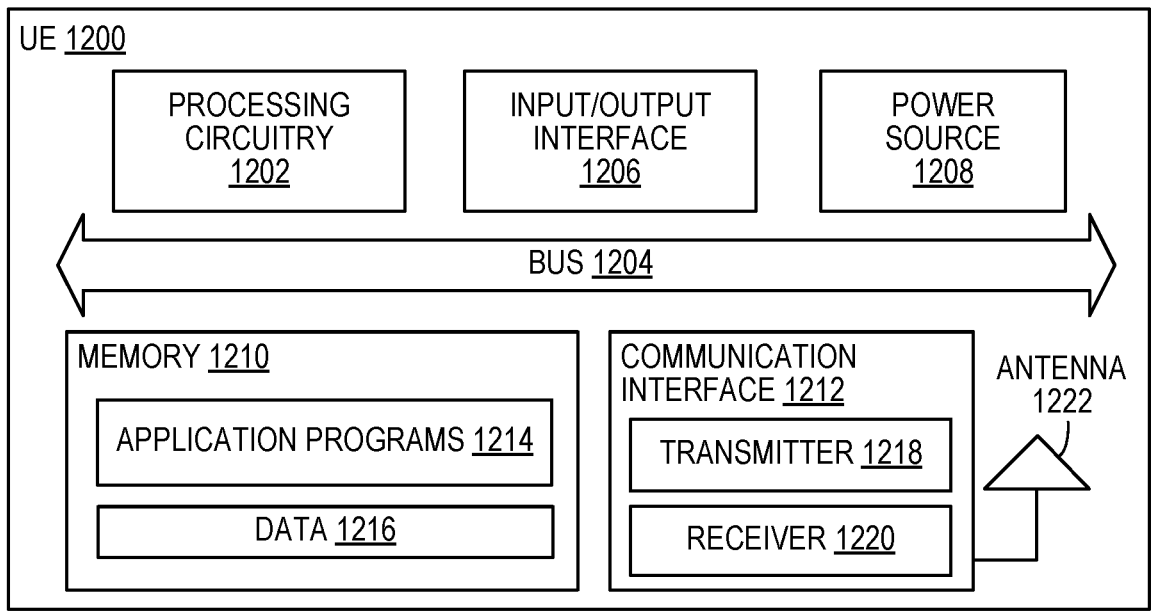
FIG. 12 shows a UE according to various embodiments of the present disclosure.

FIG. 12 shows a UE 1200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1200 includes processing circuitry 1202 that is operatively coupled via a bus 1204 to an input/output interface 1206, a power source 1208, a memory 1210, a communication interface 1212, and/or any other component, or any combination thereof. Certain UEs may utilize all or a subset of the components shown in FIG. 12. The level of integration between the components may vary from one UE to another UE. Further, certain UEs may contain multiple instances of a component, such as multiple processors, memories, transceivers, transmitters, receivers, etc.

The processing circuitry 1202 is configured to process instructions and data and may be configured to implement any sequential state machine operative to execute instructions stored as machine-readable computer programs in the memory 1210. The processing circuitry 1202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1202 may include multiple central processing units (CPUs).

In the example, the input/output interface 1206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1208 is structured as a battery or battery pack. Other types of power sources, such as an external power source (e.g., an electricity outlet), photovoltaic device, or power cell, may be used. The power source 1208 may further include power circuitry for delivering power from the power source 1208 itself, and/or an external power source, to the various parts of the UE 1200 via input circuitry or an interface such as an electrical power cable. Delivering power may be, for example, for charging of the power source 1208. Power circuitry may perform any formatting, converting, or other modification to the power from the power source 1208 to make the power suitable for the respective components of the UE 1200 to which power is supplied.

The memory 1210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1210 includes one or more application programs 1214, such as an operating system, web browser application, a widget, gadget engine, or other application, and corresponding data 1216. The memory 1210 may store, for use by the UE 1200, any of a variety of various operating systems or combinations of operating systems.

The memory 1210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1210 may allow the UE 1200 to access instructions, application programs and the like, stored on transitory or non-transitory memory media, to off-load data, or to upload data. An article of manufacture, such as one utilizing a communication system may be tangibly embodied as or in the memory 1210, which may be or comprise a device-readable storage medium.

The processing circuitry 1202 may be configured to communicate with an access network or other network using the communication interface 1212. The communication interface 1212 may comprise one or more communication subsystems and may include or be communicatively coupled to an antenna 1222. The communication interface 1212 may include one or more transceivers used to communicate, such as by communicating with one or more remote transceivers of another device capable of wireless communication (e.g., another UE or a network node in an access network). Each transceiver may include a transmitter 1218 and/or a receiver 1220 appropriate to provide network communications (e.g., optical, electrical, frequency allocations, and so forth). Moreover, the transmitter 1218 and receiver 1220 may be coupled to one or more antennas (e.g., antenna 1222) and may share circuit components, software or firmware, or alternatively be implemented separately.

In the illustrated embodiment, communication functions of the communication interface 1212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1200 shown in FIG. 12.

As yet another specific example, in an IoT scenario, a UE may represent a machine or other device that performs monitoring and/or measurements, and transmits the results of such monitoring and/or measurements to another UE and/or a network node. The UE may in this case be an M2M device, which in a 3GPP context may be referred to as an MTC device. As one specific example, the UE may implement the 3GPP NB-IoT standard. In other scenarios, a UE may represent a vehicle, such as a car, a bus, a truck, a ship and an airplane, or other equipment that is capable of monitoring and/or reporting its operational status or other status.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 13:
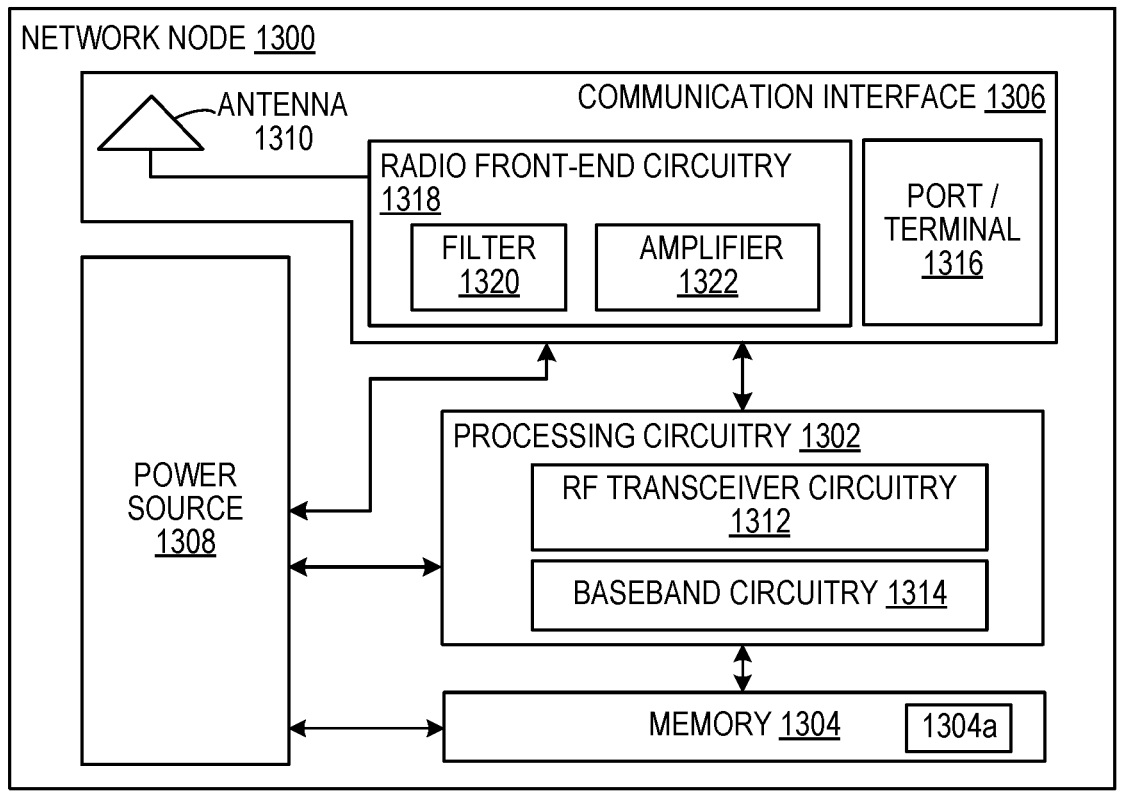
FIG. 13 shows a network node according to various embodiments of the present disclosure.

FIG. 13 shows a network node 1300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1300 includes a processing circuitry 1302, a memory 1304, a communication interface 1306, and a power source 1308. The network node 1300 may be composed of multiple physically separate components (e.g., a NodeB component and a RNC component, or a BTS component and a BSC component, etc.), which may each have their own respective components. In certain scenarios in which the network node 1300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1300 may be configured to support multiple radio access technologies (RATs). In such embodiments, some components may be duplicated (e.g., separate memory 1304 for different RATs) and some components may be reused (e.g., a same antenna 1310 may be shared by different RATs). The network node 1300 may also include multiple sets of the various illustrated components for different wireless technologies integrated into network node 1300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1300.

The processing circuitry 1302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1300 components, such as the memory 1304, to provide network node 1300 functionality.

In some embodiments, the processing circuitry 1302 includes a system on a chip (SOC). In some embodiments, the processing circuitry 1302 includes one or more of radio frequency (RF) transceiver circuitry 1312 and baseband processing circuitry 1314. In some embodiments, the radio frequency (RF) transceiver circuitry 1312 and the baseband processing circuitry 1314 may be on separate chips (or sets of chips), boards, or units, such as radio units and digital units. In alternative embodiments, part or all of RF transceiver circuitry 1312 and baseband processing circuitry 1314 may be on the same chip or set of chips, boards, or units.

The memory 1304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1302. The memory 1304 may store any suitable instructions, data, or information, including a computer program, software, an application including one or more of logic, rules, code, tables, and/or other instructions (collectively denoted as computer program product 1304a) capable of being executed by the processing circuitry 1302 and utilized by the network node 1300. The memory 1304 may be used to store any calculations made by the processing circuitry 1302 and/or any data received via the communication interface 1306. In some embodiments, the processing circuitry 1302 and memory 1304 is integrated.

The communication interface 1306 is used in wired or wireless communication of signaling and/or data between a network node, access network, and/or UE. As illustrated, the communication interface 1306 comprises port(s)/terminal(s) 1316 to send and receive data, for example to and from a network over a wired connection. The communication interface 1306 also includes radio front-end circuitry 1318 that may be coupled to, or in certain embodiments a part of, the antenna 1310. Radio front-end circuitry 1318 comprises filters 1320 and amplifiers 1322. The radio front-end circuitry 1318 may be connected to an antenna 1310 and processing circuitry 1302. The radio front-end circuitry may be configured to condition signals communicated between antenna 1310 and processing circuitry 1302. The radio front-end circuitry 1318 may receive digital data that is to be sent out to other network nodes or UEs via a wireless connection. The radio front-end circuitry 1318 may convert the digital data into a radio signal having the appropriate channel and bandwidth parameters using a combination of filters 1320 and/or amplifiers 1322. The radio signal may then be transmitted via the antenna 1310. Similarly, when receiving data, the antenna 1310 may collect radio signals which are then converted into digital data by the radio front-end circuitry 1318. The digital data may be passed to the processing circuitry 1302. In other embodiments, the communication interface may comprise different components and/or different combinations of components.

In certain alternative embodiments, the network node 1300 does not include separate radio front-end circuitry 1318, instead, the processing circuitry 1302 includes radio front-end circuitry and is connected to the antenna 1310. Similarly, in some embodiments, all or some of the RF transceiver circuitry 1312 is part of the communication interface 1306. In still other embodiments, the communication interface 1306 includes one or more ports or terminals 1316, the radio front-end circuitry 1318, and the RF transceiver circuitry 1312, as part of a radio unit (not shown), and the communication interface 1306 communicates with the baseband processing circuitry 1314, which is part of a digital unit (not shown).

The antenna 1310 may include one or more antennas, or antenna arrays, configured to send and/or receive wireless signals. The antenna 1310 may be coupled to the radio front-end circuitry 1318 and may be any type of antenna capable of transmitting and receiving data and/or signals wirelessly. In certain embodiments, the antenna 1310 is separate from the network node 1300 and connectable to the network node 1300 through an interface or port.

The antenna 1310, communication interface 1306, and/or the processing circuitry 1302 may be configured to perform any receiving operations and/or certain obtaining operations described herein as being performed by the network node. Any information, data and/or signals may be received from a UE, another network node and/or any other network equipment. Similarly, the antenna 1310, the communication interface 1306, and/or the processing circuitry 1302 may be configured to perform any transmitting operations described herein as being performed by the network node. Any information, data and/or signals may be transmitted to a UE, another network node and/or any other network equipment.

The power source 1308 provides power to the various components of network node 1300 in a form suitable for the respective components (e.g., at a voltage and current level needed for each respective component). The power source 1308 may further comprise, or be coupled to, power management circuitry to supply the components of the network node 1300 with power for performing the functionality described herein. For example, the network node 1300 may be connectable to an external power source (e.g., the power grid, an electricity outlet) via an input circuitry or interface such as an electrical cable, whereby the external power source supplies power to power circuitry of the power source 1308. As a further example, the power source 1308 may comprise a source of power in the form of a battery or battery pack which is connected to, or integrated in, power circuitry. The battery may provide backup power should the external power source fail.

Embodiments of the network node 1300 may include additional components beyond those shown in FIG. 13 for providing certain aspects of the network node's functionality, including any of the functionality described herein and/or any functionality necessary to support the subject matter described herein. For example, the network node 1300 may include user interface equipment to allow input of information into the network node 1300 and to allow output of information from the network node 1300. This may allow a user to perform diagnostic, maintenance, repair, and other administrative functions for the network node 1300.

In various embodiments, network node 1300 can implement various network functions (NFs) described herein, such as NRF, DCCF, data consumer NF, data source NF, etc. In other words, various operations performed by these NFs in different embodiments can be performed by network node 1300 and/or components thereof, such as processing circuitry 1302 and communication interface circuitry 1306.

Figure 14:
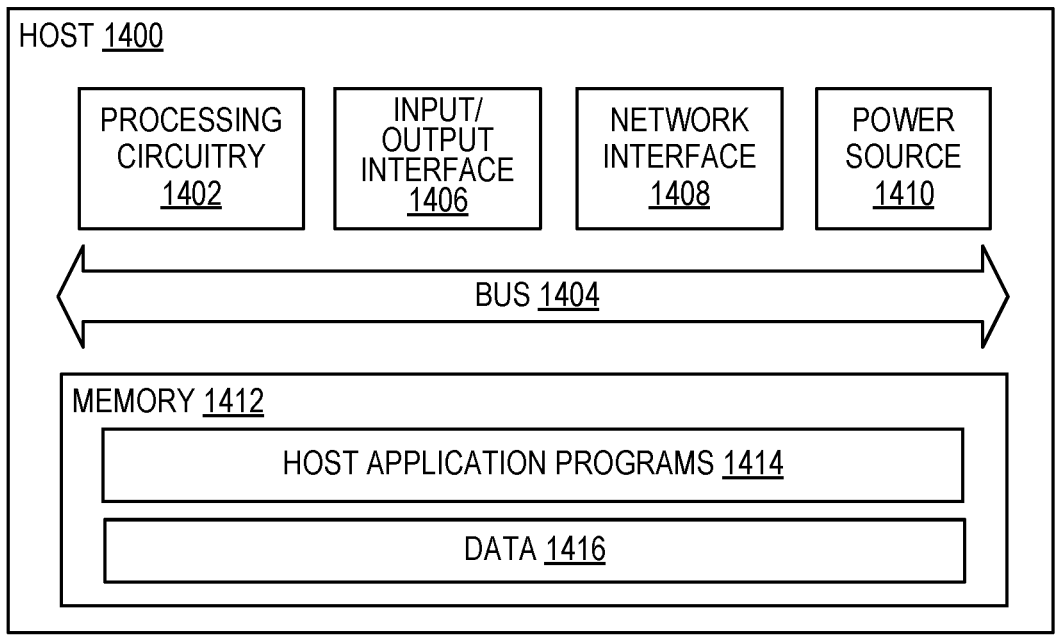
FIG. 14 shows host computing system according to various embodiments of the present disclosure.

FIG. 14 is a block diagram of a host 1400, which may be an embodiment of the host 1116 of FIG. 11, in accordance with various aspects described herein. As used herein, the host 1400 may be or comprise various combinations hardware and/or software, including a standalone server, a blade server, a cloud-implemented server, a distributed server, a virtual machine, container, or processing resources in a server farm. The host 1400 may provide one or more services to one or more UEs.

The host 1400 includes processing circuitry 1402 that is operatively coupled via a bus 1404 to an input/output interface 1406, a network interface 1408, a power source 1410, and a memory 1412. Other components may be included in other embodiments. Features of these components may be substantially similar to those described with respect to the devices of previous figures, such as FIGS. 12 and 13, such that the descriptions thereof are generally applicable to the corresponding components of host 1400.

The memory 1412 may include one or more computer programs including one or more host application programs 1414 and data 1416, which may include user data, e.g., data generated by a UE for the host 1400 or data generated by the host 1400 for a UE. Embodiments of the host 1400 may utilize only a subset or all of the components shown. The host application programs 1414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1414 may also provide for user authentication and licensing checks and may periodically report health, routes, and content availability to a central node, such as a device in or on the edge of a core network. Accordingly, the host 1400 may select and/or indicate a different host for over-the-top services for a UE. The host application programs 1414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 15:
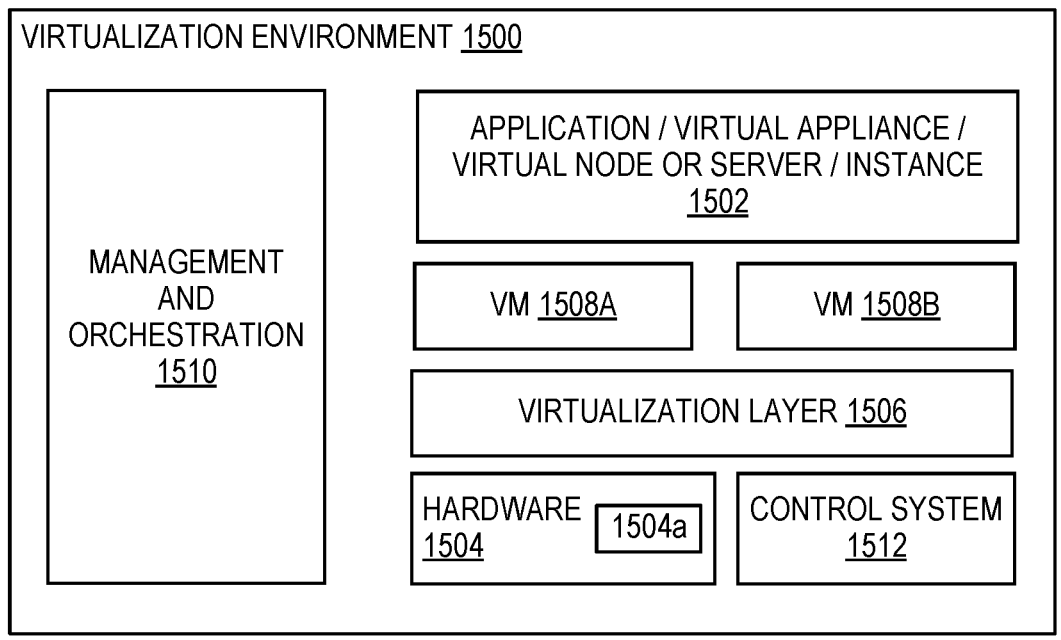
FIG. 15 is a block diagram of a virtualization environment in which functions implemented by some embodiments of the present disclosure may be virtualized.

FIG. 15 is a block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1502 (which may alternatively be called software instances, virtual appliances, network functions, virtual nodes, virtual network functions, etc.) are run in the virtualization environment 1500 to implement some of the features, functions, and/or benefits of some of the embodiments disclosed herein.

Hardware 1504 includes processing circuitry, memory that stores software and/or instructions (collectively denoted computer program product 1504a) executable by hardware processing circuitry, and/or other hardware devices as described herein, such as a network interface, input/output interface, and so forth. Software may be executed by the processing circuitry to instantiate one or more virtualization layers 1506 (also referred to as hypervisors or virtual machine monitors (VMMs)), provide VMs 1508a and 1508b (one or more of which may be generally referred to as VMs 1508), and/or perform any of the functions, features and/or benefits described in relation with some embodiments described herein. The virtualization layer 1506 may present a virtual operating platform that appears like networking hardware to the VMs 1508.

The VMs 1508 comprise virtual processing, virtual memory, virtual networking or interface and virtual storage, and may be run by a corresponding virtualization layer 1506. Different embodiments of the instance of a virtual appliance 1502 may be implemented on one or more of VMs 1508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1508 may be a software implementation of a physical machine that runs programs as if they were executing on a physical, non-virtualized machine. Each of the VMs 1508, and that part of hardware 1504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1508 on top of the hardware 1504 and corresponds to the application 1502.

Hardware 1504 may be implemented in a standalone network node with generic or specific components. Hardware 1504 may implement some functions via virtualization. Alternatively, hardware 1504 may be part of a larger cluster of hardware (e.g., such as in a data center or CPE) where many hardware nodes work together and are managed via management and orchestration 1510, which, among others, oversees lifecycle management of applications 1502. In some embodiments, hardware 1504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1512 which may alternatively be used for communication between hardware nodes and radio units.

In some embodiments, various network functions (NFs) described herein (e.g., NRF, DCCF, data consumer NF, data source NF, etc.) can be implemented in virtualization environment 1500 as virtual NFs 1502 running on hardware 1504 and, optionally, on VM(s) 1508 and/or virtualization layer 1506.

Figure 16:
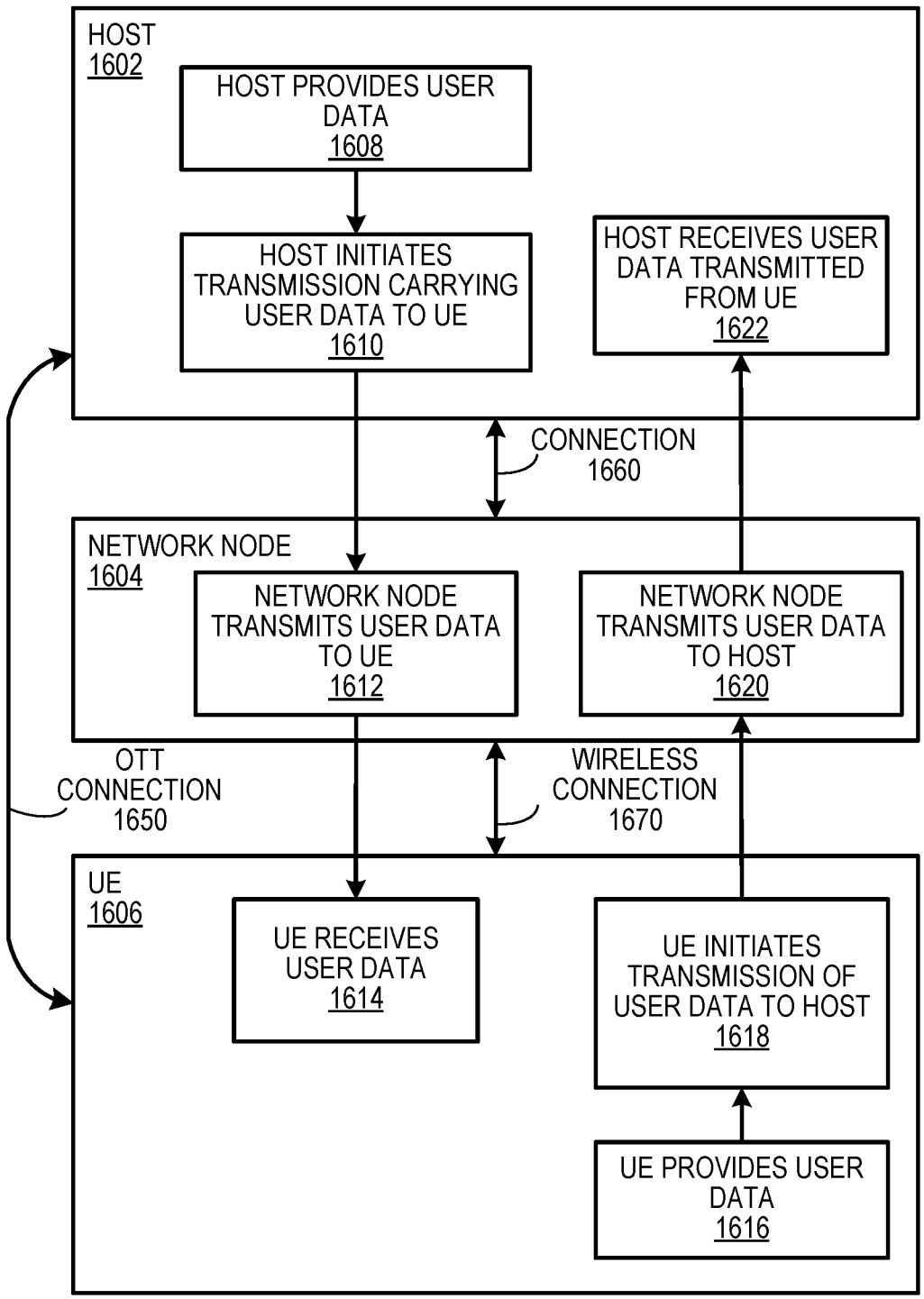
FIG. 16 illustrates communication between a host computing system, a network node, and a UE via multiple connections, according to various embodiments of the present disclosure.

FIG. 16 shows a communication diagram of a host 1602 communicating via a network node 1604 with a UE 1606 over a partially wireless connection in accordance with some embodiments. Example implementations, in accordance with various embodiments, of the UE (such as a UE 1112a of FIG. 11 and/or UE 1200 of FIG. 12), network node (such as network node 1110a of FIG. 11 and/or network node 1300 of FIG. 13), and host (such as host 1116 of FIG. 11 and/or host 1400 of FIG. 14) discussed in the preceding paragraphs will now be described with reference to FIG. 16.

Like host 1400, embodiments of host 1602 include hardware, such as a communication interface, processing circuitry, and memory. The host 1602 also includes software, which is stored in or accessible by the host 1602 and executable by the processing circuitry. The software includes a host application that may be operable to provide a service to a remote user, such as the UE 1606 connecting via an over-the-top (OTT) connection 1650 extending between the UE 1606 and host 1602. In providing the service to the remote user, a host application may provide user data which is transmitted using the OTT connection 1650.

The network node 1604 includes hardware enabling it to communicate with the host 1602 and UE 1606. The connection 1660 may be direct or pass through a core network (like core network 1106 of FIG. 11) and/or one or more other intermediate networks, such as one or more public, private, or hosted networks. For example, an intermediate network may be a backbone network or the Internet.

The UE 1606 includes hardware and software, which is stored in or accessible by UE 1606 and executable by the UE's processing circuitry. The software includes a client application, such as a web browser or operator-specific "app" that may be operable to provide a service to a human or non-human user via UE 1606 with the support of the host 1602. In the host 1602, an executing host application may communicate with the executing client application via the OTT connection 1650 terminating at the UE 1606 and host 1602. In providing the service to the user, the UE's client application may receive request data from the host's host application and provide user data in response to the request data. The OTT connection 1650 may transfer both the request data and the user data. The UE's client application may interact with the user to generate the user data that it provides to the host application through the OTT connection 1650.

The OTT connection 1650 may extend via a connection 1660 between the host 1602 and the network node 1604 and via a wireless connection 1670 between the network node 1604 and the UE 1606 to provide the connection between the host 1602 and the UE 1606. The connection 1660 and wireless connection 1670, over which the OTT connection 1650 may be provided, have been drawn abstractly to illustrate the communication between the host 1602 and the UE 1606 via the network node 1604, without explicit reference to any intermediary devices and the precise routing of messages via these devices.

As an example of transmitting data via the OTT connection 1650, in step 1608, the host 1602 provides user data, which may be performed by executing a host application. In some embodiments, the user data is associated with a particular human user interacting with the UE 1606. In other embodiments, the user data is associated with a UE 1606 that shares data with the host 1602 without explicit human interaction. In step 1610, the host 1602 initiates a transmission carrying the user data towards the UE 1606. The host 1602 may initiate the transmission responsive to a request transmitted by the UE 1606. The request may be caused by human interaction with the UE 1606 or by operation of the client application executing on the UE 1606. The transmission may pass via the network node 1604, in accordance with the teachings of the embodiments described throughout this disclosure. Accordingly, in step 1612, the network node 1604 transmits to the UE 1606 the user data that was carried in the transmission that the host 1602 initiated, in accordance with the teachings of the embodiments described throughout this disclosure. In step 1614, the UE 1606 receives the user data carried in the transmission, which may be performed by a client application executed on the UE 1606 associated with the host application executed by the host 1602.

In some examples, the UE 1606 executes a client application which provides user data to the host 1602. The user data may be provided in reaction or response to the data received from the host 1602. Accordingly, in step 1616, the UE 1606 may provide user data, which may be performed by executing the client application. In providing the user data, the client application may further consider user input received from the user via an input/output interface of the UE 1606. Regardless of the specific manner in which the user data was provided, the UE 1606 initiates, in step 1618, transmission of the user data towards the host 1602 via the network node 1604. In step 1620, in accordance with the teachings of the embodiments described throughout this disclosure, the network node 1604 receives user data from the UE 1606 and initiates transmission of the received user data towards the host 1602. In step 1622, the host 1602 receives the user data carried in the transmission initiated by the UE 1606.

One or more of the various embodiments improve the performance of OTT services provided to the UE 1606 using the OTT connection 1650, in which the wireless connection 1670 forms the last segment. More precisely, embodiments can improve data collection within a network via a data collection coordination function (DCCF) by providing efficient techniques for authorization of data consumers for both accessing the DCCF and collecting the needed data. Such techniques reduce the number of access tokens generated and the amount of signaling and workload for the network. In this manner, embodiments can facilitate easier data collection and analysis within the network, which can improve network performance. Such improved network performance can increase the value to service providers and end users of OTT services delivered via the network.

In an example scenario, factory status information may be collected and analyzed by the host 1602. As another example, the host 1602 may process audio and video data which may have been retrieved from a UE for use in creating maps. As another example, the host 1602 may collect and analyze real-time data to assist in controlling vehicle congestion (e.g., controlling traffic lights). As another example, the host 1602 may store surveillance video uploaded by a UE. As another example, the host 1602 may store or control access to media content such as video, audio, VR or AR which it can broadcast, multicast or unicast to UEs. As other examples, the host 1602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency, and other factors on which the one or more embodiments improve. There may further be an optional network functionality for reconfiguring the OTT connection 1650 between the host 1602 and UE 1606, in response to variations in the measurement results. The measurement procedure and/or the network functionality for reconfiguring the OTT connection may be implemented in software and hardware of the host 1602 and/or UE 1606. In some embodiments, sensors (not shown) may be deployed in or in association with other devices through which the OTT connection 1650 passes; the sensors may participate in the measurement procedure by supplying values of the monitored quantities exemplified above or supplying values of other physical quantities from which software may compute or estimate the monitored quantities. The reconfiguring of the OTT connection 1650 may include message format, retransmission settings, preferred routing etc.; the reconfiguring need not directly alter the operation of the network node 1604. Such procedures and functionalities may be known and practiced in the art. In certain embodiments, measurements may involve proprietary UE signaling that facilitates measurements of throughput, propagation times, latency, etc. by host 1602. The measurements may be implemented in that software causes messages to be transmitted, in particular empty or 'dummy' messages, using the OTT connection 1650 while monitoring propagation times, errors, etc.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The invention claimed is:

1. A method performed by a data consumer network function (NF) of a communication network, the method comprising:
   sending, to a network repository function (NRF) of the communication network, a request for an access token for the following:
      a service provided by a data collection coordination function (DCCF) of the communication network, and
      data to be collected via the DCCF service;
   receiving, from the NRF, at least one access token for the DCCF service and for the data to be collected via the DCCF service; and
   using the at least one access token, collecting the data from a data producer NF of the communication network via the DCCF service.

2. The method of claim 1, wherein collecting the data from the data producer NF comprises:
   sending the received at least one access token to the DCCF; and
   receiving the data from the data producer NF via the DCCF.

3. The method of claim 1, wherein the request for an access token includes a name or identifier of the DCCF service and an identifier of the data to be collected.

4. The method of claim 3, wherein the request for an access token also includes one or more of the following: an identifier of the data producer NF, and an identifier of a service that produces the data to be collected.

5. The method of claim 3, wherein:
   a single access token is received from the NRF and sent to the DCCF; and
   the single access token includes:
      an identifier of the DCCF;
      an identifier of the DCCF service;
      an identifier of the data producer NF;
      an identifier of a service of the data producer NF; and
      an identifier of the data to be collected.

6. The method of claim 3, wherein:
   first and second access tokens are received from the NRF and sent to the DCCF; and
   the first access token includes:
      an identifier of the DCCF, and
      an identifier of the DCCF service; and
   the second access token includes:
      an identifier of the data producer NF;
      an identifier of a service of the data producer NF; and
      an identifier of the data to be collected.

7. The method of claim 1, wherein the at least one access token indicates that the data consumer NF is authorized to access the DCCF service and that the data consumer NF is authorized to access the data to be collected.

8. A method performed by a data collection coordination function (DCCF) of a communication network, the method comprising:
   receiving, from a data consumer network function (NF) of the communication network, at least one access token for the following: a service provided by the DCCF, and data to be collected via the DCCF service;
   based on the at least one access token, determining whether the data consumer NF is authorized to access the DCCF service and the data to be collected; and
   based on determining that the data consumer NF is authorized to access the DCCF service and the data to be collected, performing the DCCF service to request a data producer NF to provide the data to the data consumer NF.

9. The method of claim 8, wherein:
a single access token is received from the data consumer NF; and
the single access token includes:
an identifier of the DCCF;
an identifier of the DCCF service;
an identifier of the data producer NF;
an identifier of a service of the data producer NF; and
an identifier of the data to be collected.

10. The method of claim 8, wherein:
first and second access tokens are received from the data consumer NF; and
the first access token includes:
an identifier of the DCCF, and
an identifier of the DCCF service; and
the second access token includes:
an identifier of the data producer NF;
an identifier of a service of the data producer NF; and
an identifier of the data to be collected.

11. The method of claim 8, wherein the at least one access token indicates that the data consumer NF is authorized to access the DCCF service and that the data consumer NF is authorized to access the data to be collected.

12. The method of claim 8, wherein performing the DCCF service comprises sending the at least one access token to the data producer NF.

13. The method of claim 8, further comprising:
storing the at least one access token in local storage; and
retrieving the at least one access token from local storage in response to a further request from the data consumer NF for the data to be collected.

14. A method performed by a network repository function (NRF) of a communication network, the method comprising:
receiving, from a data consumer network function (NF) of the communication network, a request for an access token for the following:
a service provided by a data collection coordination function (DCCF) of the communication network, and
data to be collected via the DCCF service;
determining whether the data consumer NF is authorized to access the DCCF service and the data to be collected via the DCCF service; and
based on determining that the data consumer NF is authorized to access the DCCF service and the data to be collected, sending, to the data consumer NF, at least one access token for the DCCF service and for the data to be collected via the DCCF service.

15. The method of claim 14, wherein the request for an access token includes a name or identifier of the DCCF service and an identifier of the data to be collected.

16. The method of claim 15, further comprising based on the identifier of the data to be collected, determining a data producer NF and a service of the data producer NF that produce the data to be collected.

17. The method of claim 15, wherein the request for an access token also includes one or more of the following: an identifier of a data producer NF that produces the data to be collected, and an identifier of a service that produces the data to be collected.

18. The method of claim 15, wherein:
a single access token is sent to the data consumer NF; and
the single access token includes:
an identifier of the DCCF;
an identifier of the DCCF service;
an identifier of the data producer NF;
an identifier of a service of the data producer NF; and
an identifier of the data to be collected.

19. The method of claim 15, wherein:
first and second access tokens are sent to the data consumer NF;
the first access token includes:
an identifier of the DCCF, and
an identifier of the DCCF service; and
the second access token includes:
an identifier of the data producer NF;
an identifier of a service of the data producer NF; and
an identifier of the data to be collected.

20. The method of claim 14, wherein the at least one access token indicates that the data consumer NF is authorized to access the DCCF service and that the data consumer NF is authorized to access the data to be collected.

21. A network node configured to implement a data consumer network function (NF) of a communication network, the network node comprising:
communication interface circuitry configured to communicate with a network repository function (NRF), a data collection coordination function (DCCF), and a data producer NF of the communication network; and
processing circuitry operably coupled to the communication interface circuitry, wherein the processing circuitry and communication interface circuitry are configured to perform the method of claim 1.

22. A network node configured to implement a data collection coordination function (DCCF) of a communication network, the network node comprising:
communication interface circuitry configured to communicate with a network repository function (NRF), a data consumer network function (NF), and a data producer NF of the communication network; and
processing circuitry operably coupled to the communication interface circuitry, wherein the processing circuitry and communication interface circuitry are configured to perform the method of claim 8.

23. A network node configured to implement a network repository function (NRF) of a communication network, the network node comprising:
communication interface circuitry configured to communicate with a data consumer network function (NF) and a data collection coordination function (DCCF) of the communication network; and
processing circuitry operably coupled to the communication interface circuitry, wherein the processing circuitry and communication interface circuitry are configured to perform the method of claim 14.

* * * * *